US007572183B2

(12) United States Patent
Olivas et al.

(10) Patent No.: US 7,572,183 B2
(45) Date of Patent: Aug. 11, 2009

(54) GAMING MACHINE INCLUDING REDO FEATURE

(75) Inventors: Consuelo Olivas, Reno, NV (US); Binh T. Nguyen, Reno, NV (US); Craig A. Paulsen, Reno, NV (US); Richard E. Michaelson, Reno, NV (US); Bryan D. Wolf, Reno, NV (US)

(73) Assignee: IGT, Reno, NV (US)

( * ) Notice: Subject to any disclaimer, the term of this patent is extended or adjusted under 35 U.S.C. 154(b) by 286 days.

(21) Appl. No.: 11/215,790

(22) Filed: Aug. 30, 2005

(65) Prior Publication Data

US 2007/0049372 A1 Mar. 1, 2007

(51) Int. Cl.
*A63F 9/24* (2006.01)
*A63F 13/00* (2006.01)

(52) U.S. Cl. ............................ 463/25; 463/10; 463/11; 463/12; 463/13; 463/16; 463/20; 463/22

(58) Field of Classification Search .................. 463/13, 463/16, 20, 21, 23, 25–27, 29, 40, 42
See application file for complete search history.

(56) References Cited

U.S. PATENT DOCUMENTS

| | | | | |
|---|---|---|---|---|
| 4,826,169 | A | 5/1989 | Bessho et al. | |
| 4,836,546 | A | 6/1989 | Dire | |
| 4,836,553 | A | 6/1989 | Suttle et al. | |
| 5,251,897 | A | 10/1993 | Fulton | |
| 5,342,049 | A | 8/1994 | Wichinsky et al. | |
| 5,382,025 | A | 1/1995 | Sklansky et al. | |
| 5,395,119 | A | 3/1995 | Jacob et al. | |
| 5,397,128 | A | 3/1995 | Hesse et al. | |
| 5,411,257 | A | 5/1995 | Fulton | |
| 5,511,781 | A | 4/1996 | Wood et al. | |
| 5,542,669 | A | 8/1996 | Charron et al. | |
| 5,704,835 | A * | 1/1998 | Dietz, II | 463/20 |

(Continued)

FOREIGN PATENT DOCUMENTS

| | | |
|---|---|---|
| AU | 2003/244623 | 3/2004 |

(Continued)

OTHER PUBLICATIONS

Barn Yard Article in Strictly Slots, published in Mar. 2002.

(Continued)

*Primary Examiner*—John M Hotaling, II
*Assistant Examiner*—Steven J. Hylinski
(74) *Attorney, Agent, or Firm*—K&L Gates LLP

(57) ABSTRACT

A wager manipulation feature for a wagering game is provided. The feature may be implemented after the player's wager is set but before game play takes place, after game play takes place or both simultaneously. If before game play, the feature enables the player to undo or nullify the wager, for example, if the player changes his or her mind or enters a wager incorrectly. If after game play, the feature provides a bonus to the player in which the player may nullify a bet after an unsuccessful outcome or increase the bet to enhance a favorable outcome. In any case, the redo feature can be accumulated in one embodiment and stored and/or restored on a gaming device ticket, player tracking card or promotion.

49 Claims, 13 Drawing Sheets

U.S. PATENT DOCUMENTS

| | | | | |
|---|---|---|---|---|
| 5,810,360 | A | 9/1998 | Srichayaporn | |
| 5,816,916 | A | 10/1998 | Moody | |
| 5,820,460 | A | 10/1998 | Fulton | |
| 5,911,418 | A | 6/1999 | Adams | |
| 5,911,419 | A | 6/1999 | Delaney et al. | |
| 5,944,315 | A | 8/1999 | Mostashari | |
| 5,951,012 | A | 9/1999 | Feola | |
| 5,984,310 | A | 11/1999 | English | |
| 5,984,782 | A | 11/1999 | Inoue | |
| 6,029,976 | A | 2/2000 | Brunelle | |
| 6,065,753 | A * | 5/2000 | Morosky | 273/292 |
| 6,113,103 | A | 9/2000 | Mostashari | |
| 6,132,311 | A | 10/2000 | Williams | |
| 6,179,291 | B1 | 1/2001 | Vancura | |
| 6,189,888 | B1 | 2/2001 | Brunelle | |
| 6,270,079 | B1 | 8/2001 | Chamberlain | |
| 6,270,405 | B1 * | 8/2001 | Ferguson | 463/13 |
| 6,273,424 | B1 | 8/2001 | Breeding | |
| 6,305,686 | B1 | 10/2001 | Perrie et al. | |
| 6,311,979 | B1 | 11/2001 | Andrews | |
| 6,315,663 | B1 | 11/2001 | Sakamoto | |
| 6,336,860 | B1 | 1/2002 | Webb | |
| 6,342,007 | B1 | 1/2002 | Wood et al. | |
| 6,406,020 | B1 | 6/2002 | Reed | |
| 6,413,162 | B1 | 7/2002 | Baerlocher et al. | |
| 6,435,506 | B1 | 8/2002 | Piccoli | |
| 6,443,452 | B1 | 9/2002 | Brune | |
| 6,446,971 | B1 | 9/2002 | Baranauskas | |
| 6,511,068 | B1 | 1/2003 | Sklansky et al. | |
| 6,523,829 | B1 | 2/2003 | Walker et al. | |
| 6,540,230 | B1 | 4/2003 | Walker et al. | |
| 6,561,897 | B1 | 5/2003 | Bourbour et al. | |
| 6,634,945 | B2 | 10/2003 | Glavich et al. | |
| 6,676,512 | B2 | 1/2004 | Fong et al. | |
| 6,726,563 | B1 | 4/2004 | Baerlocher et al. | |
| 6,746,016 | B2 | 6/2004 | Perrie et al. | |
| 6,802,773 | B2 | 10/2004 | Moody et al. | |
| 6,811,486 | B1 * | 11/2004 | Luciano, Jr. | 463/24 |
| 6,827,348 | B1 | 12/2004 | Mitchell | |
| 6,875,108 | B1 | 4/2005 | Hughs-Baird | |
| 6,913,531 | B1 * | 7/2005 | Yoseloff | 463/13 |
| 6,913,532 | B2 | 7/2005 | Baerlocher et al. | |
| 6,923,446 | B2 * | 8/2005 | Snow | 273/292 |
| 6,932,340 | B1 | 8/2005 | Schaefer et al. | |
| 6,938,900 | B2 * | 9/2005 | Snow | 273/292 |
| 6,955,600 | B2 | 10/2005 | Glavich et al. | |
| 6,960,133 | B1 | 11/2005 | Marks et al. | |
| 7,001,274 | B2 | 2/2006 | Baerlocher et al. | |
| 7,014,560 | B2 | 3/2006 | Glavich et al. | |
| 7,066,814 | B2 | 6/2006 | Glavich et al. | |
| 7,094,148 | B2 | 8/2006 | Baerlocher et al. | |
| 7,140,614 | B2 * | 11/2006 | Snow | 273/274 |
| 7,393,278 | B2 | 7/2008 | Gerson et al. | |
| 2001/0046890 | A1 * | 11/2001 | Ferguson | 463/13 |
| 2002/0010022 | A1 * | 1/2002 | Vincent | 463/42 |
| 2002/0027322 | A1 * | 3/2002 | Breeding et al. | 273/292 |
| 2003/0060249 | A1 * | 3/2003 | Guarnieri | 463/2 |
| 2003/0060272 | A1 * | 3/2003 | Glavich et al. | 463/25 |
| 2003/0134242 | A1 | 7/2003 | Hart et al. | |
| 2003/0162585 | A1 | 8/2003 | Bigelow, Jr. et al. | |
| 2004/0048650 | A1 * | 3/2004 | Mierau et al. | 463/20 |
| 2004/0053672 | A1 | 3/2004 | Baerlocher et al. | |
| 2004/0061288 | A1 * | 4/2004 | Snow | 273/274 |
| 2004/0084843 | A1 * | 5/2004 | Snow | 273/292 |
| 2004/0090003 | A1 * | 5/2004 | Snow | 273/274 |
| 2004/0090005 | A1 * | 5/2004 | Snow | 273/292 |
| 2004/0147306 | A1 | 7/2004 | Randall et al. | |
| 2004/0147314 | A1 | 7/2004 | LeMay et al. | |
| 2004/0171416 | A1 | 9/2004 | Baerlocher et al. | |
| 2004/0171420 | A1 | 9/2004 | Baerlocher et al. | |
| 2004/0217548 | A1 * | 11/2004 | Snow | 273/292 |
| 2005/0029744 | A1 * | 2/2005 | Yoseloff et al. | 273/292 |
| 2005/0040601 | A1 * | 2/2005 | Yoseloff et al. | 273/292 |
| 2005/0051958 | A1 * | 3/2005 | Snow | 273/274 |
| 2005/0051960 | A1 * | 3/2005 | Snow | 273/274 |
| 2005/0059452 | A1 | 3/2005 | Hartl | |
| 2005/0059473 | A1 | 3/2005 | Gomez et al. | |
| 2005/0070354 | A1 | 3/2005 | Baerlocher et al. | |
| 2005/0075163 | A1 | 4/2005 | Cuddy et al. | |
| 2005/0110215 | A1 * | 5/2005 | Jackson | 273/292 |
| 2005/0233801 | A1 | 10/2005 | Baerlocher et al. | |
| 2005/0266917 | A1 | 12/2005 | Glavich et al. | |
| 2006/0068884 | A1 | 3/2006 | Baerlocher et al. | |
| 2006/0068885 | A1 | 3/2006 | Cregan et al. | |
| 2006/0073876 | A1 | 4/2006 | Cuddy | |
| 2006/0084486 | A1 | 4/2006 | Belger et al. | |
| 2006/0084494 | A1 | 4/2006 | Belger et al. | |
| 2006/0119044 | A1 * | 6/2006 | Kekempanos et al. | 273/292 |
| 2006/0252542 | A1 * | 11/2006 | Nicely | 463/36 |
| 2007/0069470 | A1 * | 3/2007 | Snow | 273/292 |
| 2007/0102882 | A1 * | 5/2007 | Snow | 273/292 |

FOREIGN PATENT DOCUMENTS

| | | | |
|---|---|---|---|
| EP | 1 184 822 | | 6/2003 |
| GB | 1 297 712 | A | 11/1972 |
| GB | 2 086 631 | A | 5/1982 |
| GB | 2 090 690 | A | 7/1982 |
| GB | 2 096 376 | A | 10/1982 |
| GB | 2 097 160 | A | 10/1982 |
| GB | 2 098 781 | A | 11/1982 |
| GB | 2 100 905 | A | 1/1983 |
| GB | 2 105 891 | A | 3/1983 |
| GB | 2 117 155 | A | 10/1983 |
| GB | 2 137 392 | A | 10/1984 |
| GB | 2 161 008 | A | 1/1986 |
| GB | 2 170 643 | A | 8/1986 |
| GB | 2 181 589 | A | 4/1987 |
| GB | 2 183 882 | A | 6/1987 |
| GB | 2 191 030 | A | 12/1987 |
| GB | 2 222 712 | A | 3/1990 |
| GB | 2 225 889 | A | 6/1990 |
| GB | 2 226 436 | A | 6/1990 |
| GB | 2 242 300 | A | 9/1991 |
| GB | 2 262 642 | A | 6/1993 |
| GB | 2 335 524 | A | 9/1999 |
| GB | 2 393 555 | A | 3/2004 |
| WO | WO 2005/002690 | | 1/2005 |

OTHER PUBLICATIONS

Gold Fever Advertisement written by Atronic Casino Technology, Ltd., published 1999.

Gold Fever Atronic Web Page written by Atronic Casino Technology, Ltd., dated Mar. 2002.

Jewel in the Crown Advertisement written by Barcrest Ltd., published 1999.

Marshall Fey, Slot Machines, A Pictorial History of the first 100 years, Draw Poker Dice (p. 74 to 75, 1997, fifth edition.

Spin and Hold, Article in Strictly Slots, written by IGT, published in Jan. 2003.

Super Stars Spin, written by IGT, pulished in 2003.

Roaring 20s article written by Strictly Slots, published Aug. 2008.

* cited by examiner

FIG. 10

PAYTABLE

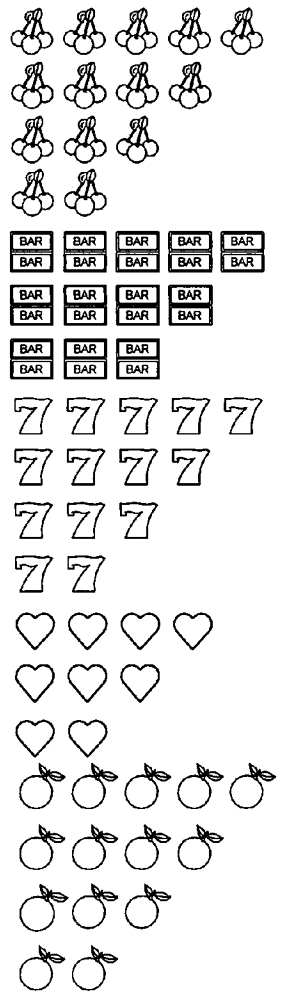

GAME PLAY REQUEST

Ⓡ Ⓡ Ⓡ - REDO feature, may require minimum wager, such as;

(i) payline active,
(ii) maximum paylines wagered,
(iii) maximum wager per payline made,
(iv) maximum bet wagered.

WAGER Requirements (one or more of;)
(i) after 50 game plays,
(ii) after 50 credits wagered,
(iii) after 50 credits lost,
(iv) after 50 credits won
(v) after 30 minutes of gaming.

Insurance- for each $1.00 wagered, player may purchase insurance undo feature for $.25, which will enable the player to undo the wager after game play (eligible once every ten game plays) or $.05 for any wager, any time, before game play.
Bonus - yields two to ten REDO options, which can be accumulated and downloaded to player trading card or ticket if unused.

FIG. 11

16,18

PAYTABLE OPERATION REDO FEATURE

HOW REDO FEATURE IS RECALLED

1. Generated and appears randomly without player input.
2. Selectively recalled from a player tracking account.
3. Selectively recalled from a ticket, voucher, etc.
4. Selectively recalled from a promotion.
5. Purchased as insurance.

HOW LONG REDO FEATURE IS AVAILABLE

1. The next game play only
2. over a predetermined number of plays
3. over a randomly determined number of plays
4. until an option terminator is generated
5. until player cashes out
6. until player exhausts all credits
7. over a set period of time
8. indefinitely, unused or accumulated redo features may be saved to player tracking card or printed onto ticket.

GAMING MACHINE INCLUDING REDO FEATURE

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

Gaming devices provide enjoyment and excitement to players, in part, because they may ultimately lead to monetary awards for the players. Gaming devices also provide enjoyment and excitement to players because they are fun to play. Bonus features, in particular, provide gaming device manufacturers with the opportunity to add enjoyment and excitement to that which is already expected from a base game of the gaming device. Bonus features provide additional gaming experiences to the player.

Gaming devices in most jurisdictions are typically games of luck, not skill. They are configured on average to pay back a certain percentage of the amount of money wagered. The average payback percentage in most wagering games is set high enough that any player who plays a few hands or spins of the reels wins. That is, in most wagering games it is not too difficult to experience some level of success.

While the outcomes of wagering games are determined at least in part by luck, the player controls one important component, namely the wager or amount of the wager. Wagering games commonly require a minimum bet, for example, at least a nickel along one payline of a slot machine. The wagering games also have maximum wagers such as five nickels on each of the nine paylines of a slot machine or $0.45. For each game play, the player decides how high to wager, for example, five cents or multiples thereof up to $0.45.

The ability to vary the wager provides the player with a sense of control. Increasing a wager during winning streaks and decreasing the wager during losing streaks benefits the player. The ability to vary the wager also benefits the casino because the ability provides control to the player, enhancing the gaming experience, without changing the average expected payback percentage of the wagering game.

It is therefore desirable to increase or enhance the player's control over the wager, further enhancing the gaming experience, and to do so without materially impacting the average expected payback percentage of the wagering game.

SUMMARY

Various embodiments of the present disclosure provide undo or redo features for a gaming machine or device including a wagering game. The redo feature (referring collectively herein to a wager undo and a wager redo) enables the player to change the player's wager after a point in the wagering sequence for which it is otherwise conventionally too late to alter the wager.

For example, in a slot game embodiment, the player typically selects a number of paylines to play and a number of credits to wager on each of the played paylines. Afterwards, the player activates an input device to cause the reels to spin or the reels automatically spin and the player accept the consequences based on the selected wager. For a multi-payline slot, the consequences can include: (i) a total loss of the wager; (ii) a partial loss of the wager; (iii) an even return on the wager; or (iv) a win of more than the wager (along one or more or all of the wagered or active paylines). The redo feature in one embodiment enables the player to cancel the wager after selecting the number of paylines and the wager per payline (but before the activation of the reels). After the cancellation, the player can (i) place a different wager, (ii) place the same wager, or (iii) cash out.

The redo feature can be configured to be activated at one or more different stages of the wagering and game play sequence. In one embodiment, the gaming device employs a scrolling wager selector and an enter or confirm button. In one such embodiment, the redo feature can be activated after the player scrolls to the desired wager and selects the enter button but before the player selects the play button such as the spin or deal button. In another embodiment, the gaming device displays each of the possible wagers simultaneously, the selection of any of which sets the wager without an additional confirming input by the player. Here, the redo feature can be implemented after the player selects one of the dedicated wager buttons but before the player selects the play button. The above examples apply to wagering games having a single wager variable, for example, a number of credits on a single hand of poker, or multiple wager variables, for example, a paylines selection and a wager per payline selection.

Alternatively or additionally, the redo feature may be activated after the player presses the play button such as during or after a game play. Enabling the player to activate the redo feature after a game play highlights the distinction between a redo and an undo. That is, if the player activates the feature after making the bet but before the game play starts, the player wishes to remove, eliminate or undo the bet. If the player activates the feature after game play, two possibilities exist: (i) the result is unfavorable or not as favorable as the player would like and the player wishes to undo or eliminate the bet and corresponding result; or (ii) the result is favorable and the player wishes to redo or increase the bet and still obtain the same corresponding result. The present disclosure includes the implementation of either or both possibilities and the selective application or activation of such features.

In alternative embodiments, the player can activate the redo feature during a specified period of time. The period of time can be any suitable period of time. The amount of the period of time can be determined in any suitable manner such as being predetermined, randomly determined, based on a player's status (such as through a player tracking system) and based on wagering levels. The time period can also be triggered in any suitable manner. In one embodiment, the player can activate the redo feature only during a countdown period such as for five seconds after the bet is made or after play has occurred. In one embodiment, the gaming device includes a suitable display device which displays or provides a countdown audibly, visibly, or both. In a further embodiment, the redo feature when obtained is applied automatically to: (i) a next or designated unsuccessful play; (ii) a next or designated successful play; or (iii) either. In one embodiment, the time period is based on the time of day. It should be appreciated that the time period may be determined in any suitable manner.

The present disclosure includes multiple embodiments for the requirements for issuing a redo option or feature to the player. In one embodiment, a random outcome from one or more game plays triggers the issuance of one or more redo features to the player. In one such embodiment, the redo feature is or is similar to a bonus event or game or provided like a bonus event or game. Game play can thus be base game play or bonus game play.

The game play issuance can also be conditioned upon a particular wager requirement or level such as maximum paylines or maximum bet wagered by the player or account. That is, the player must meet a designated wager requirement or level to (and in one embodiment obtain the needed random outcome) to trigger the issuance of the redo feature.

In various embodiments, the issuance of the redo option is game play based, such as issued upon: (i) a particular number of game plays; (ii) a particular number of credits wagered; (iii) a particular number of credits lost or won; or (iv) after a particular amount of time during which the player carries a positive credit balance. Any of the aforementioned game play based criterion can be implemented and tracked at the machine or via the player's tracking card and/or a player tracking system. For example, the number of game plays, credits wagered, credits won or lost or time of play can be carried over from one machine to another via the player tracking card or account. The player tracking is conventionally done on a network basis, such as a casino network or other type of local area or wide area network.

In one embodiment, the redo feature serves as a form of insurance, in which the player pays a particular amount to purchase an undo option, which the player can apply to insure one or more particular wagers. The purchase of redo insurance may be made available at certain times, as with blackjack, or at all times. The insurance option for example could cost the player $0.25 to undo a $1.00 wager.

In one embodiment, the redo feature is provided as a promotion or marketing item. For example, casinos can send one or more redo options to potential new players or valued existing customers. The promotion in one embodiment is redeemed at the casino through the player's tracking card or through a ticket that the gaming machines can read. Alternatively, the promotion may be a pre-printed ticket that the gaming machine can read.

It should be appreciated that the existence of the redo feature or option can be communicated to the player in a plurality of ways. The gaming device itself can communicate the existence of the redo feature and its particular implementation. The pay table of the gaming device can explain how the player obtains a redo option, how it is used, how long it is valid, and when it is used. In gaming machines where many wagering games are displayed by a video monitor, the monitor or a separate display can be configured to display to the player when a redo option has been accrued and how many redo options are available. The display or monitor may also be configured to remind the player as to when and how the redo option is used.

As discussed above, the existence of an available redo feature may also be communicated to the player in the form of a machine-usable ticket or redeemable promotion. After the ticket is loaded into the machine or downloaded from a player tracking system, the machine's monitor or display displays the redo feature in the manner explained above.

The present disclosure also includes multiple embodiments for how the redo option is recalled and how long the option is available. If the option is generated randomly, it is not recalled, it just appears. Alternatively, as noted above, the player may selectively recall the option from a player tracking card, a ticket, a promotion, or selectively purchase the options.

Once recalled, the option may be available: (i) for the next play only; (ii) over a predetermined number of plays; (iii) over a randomly determined number of plays; (iv) until an option terminator is generated; (v) until the player cashes out; (vi) until the player runs out of credits; or (vii) until a designated time period expires. If the player wishes to cash out without using one or more redo option, the player in one embodiment is enabled to re-save the option to the player's tracking account or print the option to a ticket.

As discussed herein, the redo feature may be implemented with many different types of wagering machines, such as video slots poker, keno, blackjack, craps, etc. The redo feature may also be implemented with various ones of those games played live at a table game or over an internet or other data network.

It is therefore an advantage of the presently disclosed gaming device to provide a redo feature.

Another advantage of the presently disclosed gaming device is to enable the player to change his or her mind or correct a mistake concerning the player's wager.

A further advantage of the presently disclosed gaming device is to enable the player to enhance the outcome of a successful game play.

Another advantage of the presently disclosed gaming device is to help younger and older players who may be less experienced or more prone to mistakes.

A further advantage of the presently disclosed gaming device is to provide a marketing tool for casinos and game manufacturers.

Another advantage of the presently disclosed gaming device is to provide a bonus that can be implemented with video, live and internet forms of many different wagering games, such as slots, poker, keno, blackjack, craps, etc.

Additional features and advantages are described herein, and will be apparent from, the following Detailed Description and the figures.

BRIEF DESCRIPTION OF THE FIGURES

FIG. 10 is an elevation view of a display device of a slot machine showing a pay table describing various aspects of the redo feature disclosed herein.

FIG. 11 is an elevation view of a display device of a slot machine showing an operation screen describing various aspects of the redo feature disclosed herein.

DETAILED DESCRIPTION

Gaming Devices Generally

The present disclosure provides a gaming device that enables the player to redo (undue or change) the player's wager. It is helpful to describe more general features of gaming devices suitable for use with the redo feature before addressing specific features of the redo feature or option. The redo option may be implemented in many types of wagering games, such as slot, poker, keno, craps, blackjack, roulette and the like. The wagering game may comprise any suitable reel-type game, card game, number game or other game of chance susceptible to representation in an electronic or electromechanical form, which produces a random outcome based on probability data or random number generator. For convenience, much of the present disclosure is described using slot machines as an example. The teachings exemplified via the slot machine description are applicable to any of the above-listed machines or types of machines.

Figure 1A:
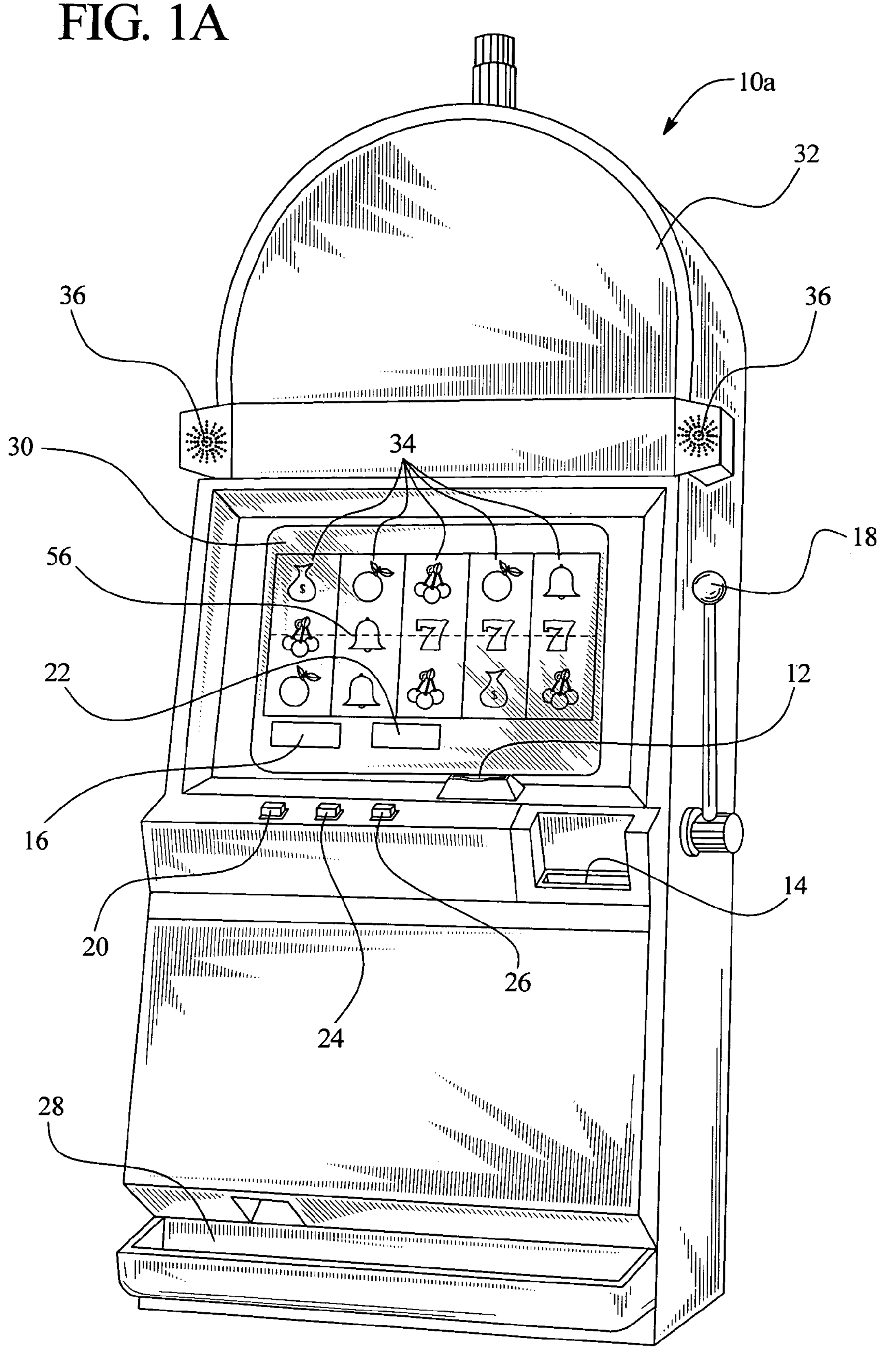
FIG. 1A is a front perspective view of one embodiment of the gaming device disclosed herein.
Figure 1B:
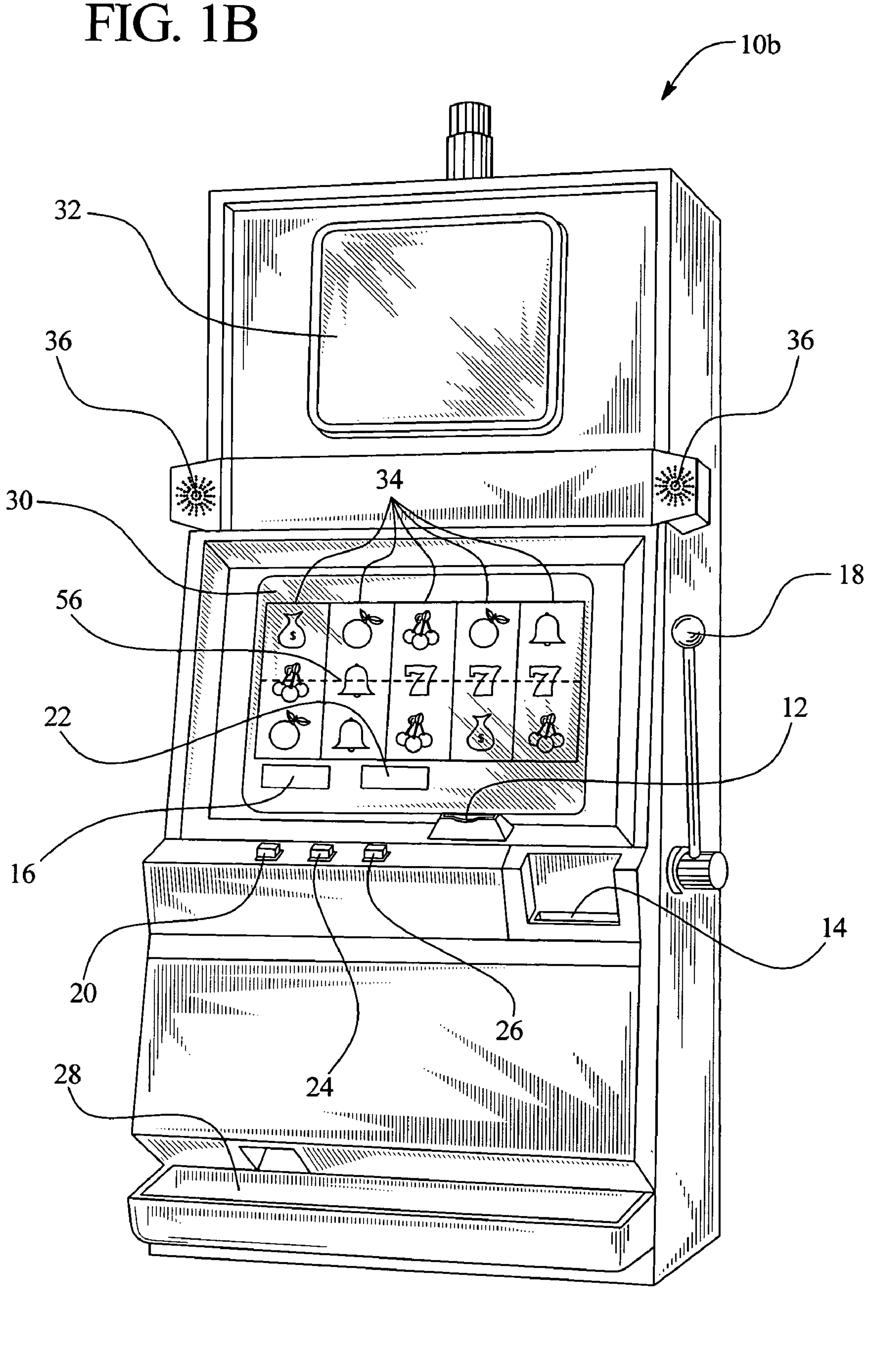
FIG. 1B is a front perspective view of another embodiment of the gaming device disclosed herein.
Figure 2:
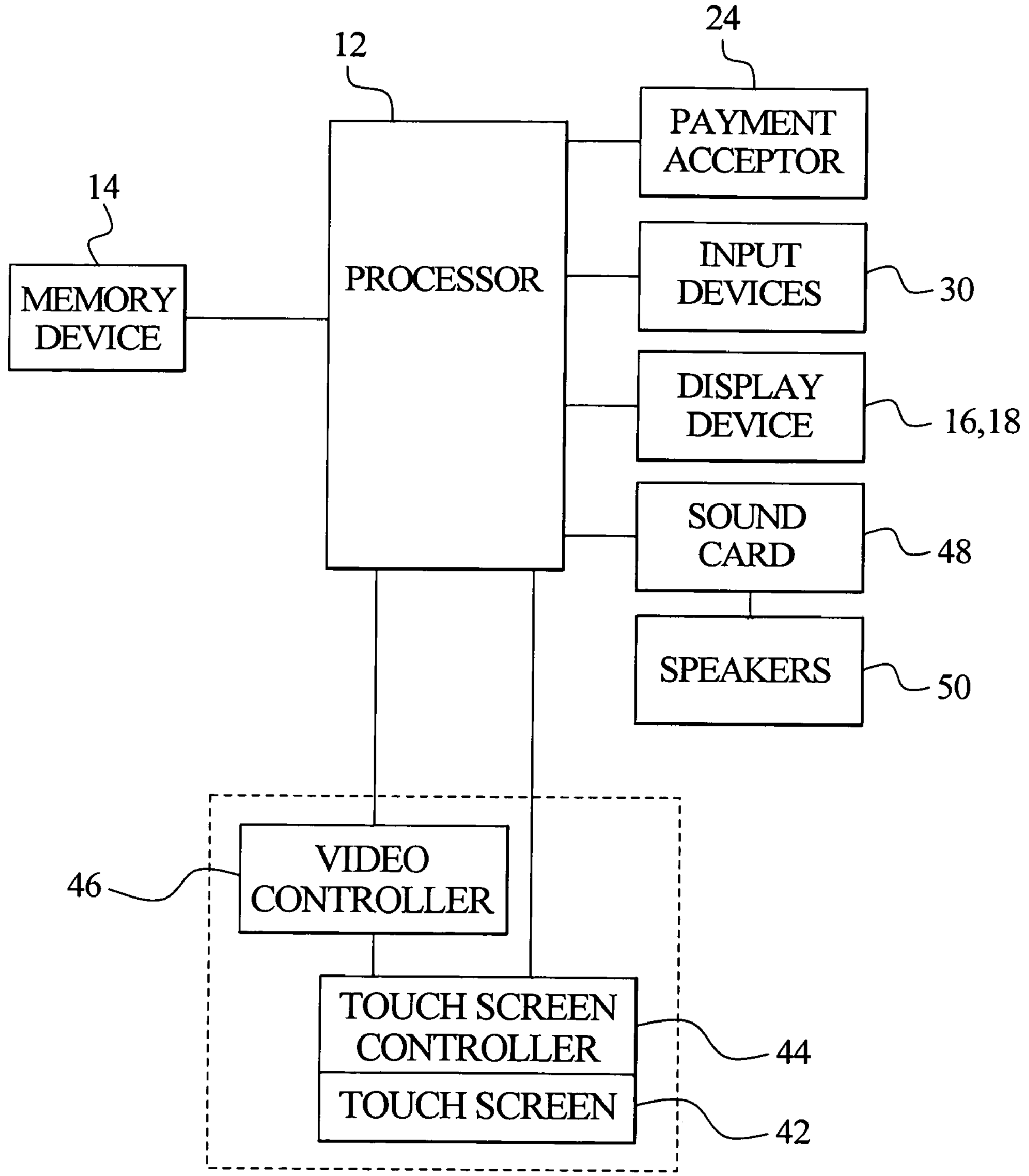
FIG. 2 is a schematic block diagram of one embodiment of an electronic configuration for one of the gaming devices disclosed herein.

Referring now to FIGS. 1A, 1B and 2, two alternative embodiments of a gaming device suitable for use with the present disclosure are illustrated as gaming device 10*a* and gaming device 10*b*, respectively. Gaming device 10*a* and/or gaming device 10*b* are generally referred to herein as gaming device 10. Many of the components discussed below for gaming device 10 are applicable regardless of whether gaming device 10 is a slot machine, poker machine, keno machine, roulette machine and the like. Certain features are specific to slot machines but have analogous structure in other types of machines. For example, slot machines have multiple paylines, which are analogous to multiple wagerable hands of poker, multiple simultaneous plays of keno, and multiple roulette numbers played simultaneously.

In one embodiment, as illustrated in FIGS. 1A and 1B, gaming device 10 has a support structure, housing or cabinet that provides support for a plurality of displays, inputs, controls and other features of a conventional gaming machine. Gaming device 10 is configured to be operated by a player standing or sitting. The gaming device may be positioned on a base or stand or be configured as a pub-style table-top game (not shown), which a player can operate while sitting. As illustrated by the different configurations shown in FIGS. 1A and 1B, gaming device 10 can be constructed with varying cabinet and display configurations.

In one embodiment illustrated in FIG. 2, gaming device 10 includes at least one processor 12, such as a microprocessor, a microcontroller-based platform, a suitable integrated circuit or one or more application-specific integrated circuits (ASIC's). Processor 12 is in communication with or operable to access or to exchange signals with at least one data storage or memory device 14. In one embodiment, processor 12 and memory device 14 reside within the cabinet of gaming device 10. Memory device 14 stores program code and instructions, executable by processor 12, to control gaming device 10. Memory device 14 also stores other data such as image data, event data, player input data, random or pseudo-random number generators, pay table data or other operating data, information and applicable game rules that relate to the play of gaming device 10.

Memory device 14 includes random access memory ("RAM") and read only memory ("ROM") in one preferred embodiment. Alternatively or additionally, memory device 14 includes flash memory and/or EEPROM (electrically erasable programmable read only memory). Any other suitable magnetic, optical and/or semiconductor memory may be implemented in conjunction with gaming device 10 of the present disclosure.

In one embodiment, part or all of the program code and/or operating data described above can be stored in a detachable or removable memory device, including but not limited to, a suitable cartridge, disk or CD ROM. A player can use such a removable memory device in a desktop, a laptop personal computer, a personal digital assistant ("PDA") or other computerized platform.

In one embodiment, processor 12 of gaming device 10 controls one or more display devices 16, 18. Display devices 16, 18 are connected to or mounted to the cabinet of gaming device 10. The embodiment shown in FIG. 1A includes a central display device 16, which can display a primary or base game, e.g., the typical game of slot, poker, keno, roulette, etc. Display device 16 may also display any suitable bonus or secondary game associated with the primary game as well as information relating to the primary and/or secondary game. The alternative embodiment shown in FIG. 1B includes a central display device 16 and an upper display device 18. Upper display device 18 may additionally or alternatively display the primary game, any suitable secondary game associated with the primary game and/or information relating to the primary or secondary game.

Display devices 16 and 18 may include without limitation, a monitor, a television display, a plasma display, a liquid crystal display ("LCD"), a display employing light emitting diodes ("LED") or any other suitable electronic device or display mechanism. In one embodiment, as described in more detail below, display device 16 or 18 includes a touchscreen 42 with an associated touchscreen controller 44. Display devices 16 and 18 may alternatively or additionally include mechanical or electromechanical components, such as reels 34 and wheels. The Display devices 16 and 18 may be of any suitable size, shape or configuration.

Display devices 16 and 18 of gaming device 10 are configured to display one or a plurality of games or other suitable images, symbols and indicia, such as any visual representation or exhibition of the movement of objects. Display devices 16 or 18 may have mechanical, virtual or video reels and wheels, dynamic lighting, video images and images of people, characters, places, things, faces of cards, tournament advertisements, promotions and the like.

In one embodiment, the symbols, images and indicia displayed on or by display devices 16 or 18 are in mechanical or electromechanical form. That is, display devices 16 or 18 may include any suitable electromechanical device, which moves one or more mechanical objects, such as one or more mechanical rotatable wheels or reels 34 that each display at least one image, symbol or indicia.

As illustrated in FIG. 2, in one embodiment, gaming device 10 includes at least one payment acceptor 24 in communication with processor 12. As seen in FIGS. 1A and 1B, payment acceptor 24 may include a coin slot 26 and a payment, note or bill acceptor 28, in each of which the player inserts money, coins or tokens. The player can place coins in the coin slot or paper money, ticket or voucher into the payment, note or bill acceptor. In other embodiments, devices such as readers or validators for credit cards, debit cards, data cards or credit slips could be used for accepting payment.

As seen in FIGS. 1A, 1B, 2 and 4 in one embodiment gaming device 10 includes at least one input device 30 (generally) that communicates with processor 12. Input devices 30 can include any suitable apparatus that enables the player to produce an input signal read by processor 12. Input device 30, for example, can be a game activation device, such as a pull arm 32 or a play button 34. The player activates play button 34 to start a primary game or sequence of events in gaming device 10. Input device 30 can be any suitable wager activator such as a select paylines button 36*a*, a bet one button 36*b*, a max bet button 36*c* or a repeat bet button. Any of the input devices described herein may be touch screen input devices or electromechanical as desired.

As seen in FIGS. 1A and 1B, in one embodiment gaming device 10 includes a credit display 20, which displays a player's current number of credits, cash, account balance or the equivalent. In one embodiment, gaming device 10 includes a paylines bet display 22*a*, a credits wagered per payline display 22*b* and a total credits wagered display 22*c*.

Figure 4:
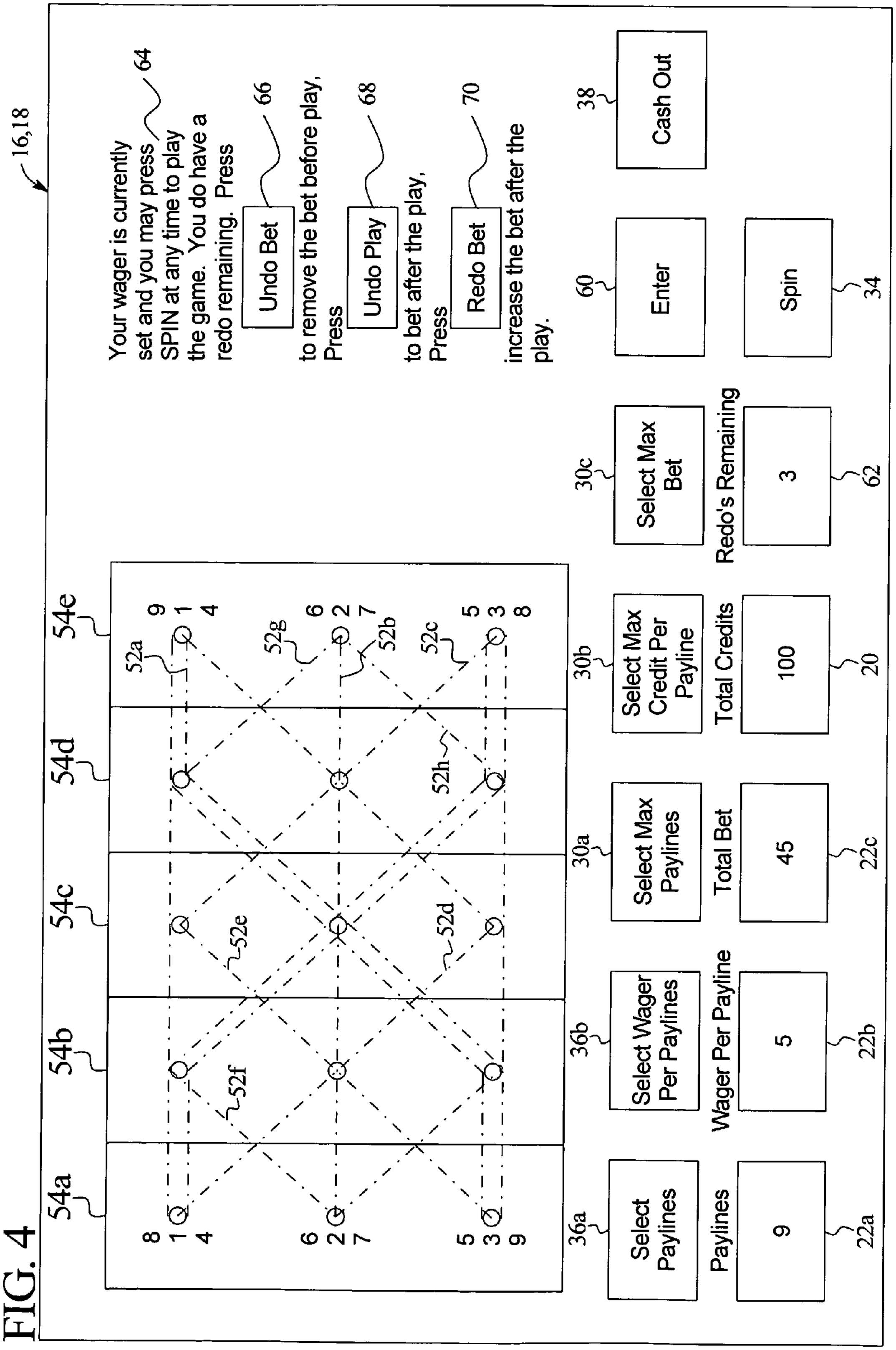
FIG. 4 is an elevation view of a display device of a slot machine showing various aspects of the redo feature disclosed herein.

As seen in FIG. 4, the slot machine includes multiple paylines 52. As described briefly above and shown in FIG. 4, gaming device 10 includes an increase paylines button 36*a* and a bet one button 36*b*. The player increases the number of paylines 52 (e.g., by one payline) each time the player presses the increase paylines button 36*a*. When the player reaches the maximum number of paylines 52 (e.g., nine paylines), the next press of the increase paylines button 36*a* returns the paylines selected back to the minimum number of wagered paylines (e.g., one payline). The player increases the wager per payline 52 (e.g., by one credit) each time the player presses the bet one button 36*b*. When the player reaches the maximum number of credits wagered per payline 52 (e.g., five credits per payline), the next press of the bet one button 36*b* returns the credits per payline selected back to the minimum number of credits per wagered payline (e.g., one).

In one embodiment, each time the player pushes the increase paylines button 36*a* the number of paylines shown in payline display 22*a* and total wager display 22*c* increases by one and the number of credits shown in credit display 20 decreases by one. Each time the player pushes the bet one button 36*b* the number of credits shown in credit display 20 decreases by one, and the number of credits shown in bet per payline display 22*b* and total wager display 22*c* increases by one.

Other wagering input devices 30 are provided, such as a maximum paylines button 30*a*, a maximum wager per payline button 30*b* and a max bet button 30*c*. The maximum paylines button 30*a* enables the player to bet the maximum number of paylines associated with gaming device 10 (e.g., nine paylines) with one button press. The maximum bet per payline button 30*b* enables the player to bet the maximum wager per payline associated with gaming device 10 (e.g., five credits per paylines) with one button press. The max bet button 30*c* enables the player to bet the maximum wager permitted for a game associated with gaming device 10 (e.g., forty-five coins)

Gaming device 10 also includes a cash out button 38. The player pushes cash out button 38 to receive a cash payment or other suitable form of payment corresponding to the number of remaining credits shown in credit display 20. In one embodiment, when the player cashes out, the player receives coins or tokens in a coin payout tray 40. In another embodiment, when the player cashes out, the player receives another type of payout mechanism, such as a ticket or credit slip, which is redeemable by a cashier or is funded to the player's electronically recordable identification card.

As mentioned above and seen in FIG. 2, a touchscreen 42 or other type of touch-sensitive display overlay may be provided, which operates with a touchscreen controller 44 to allow the player to interact with the images on display device 16 or 18. Touchscreen 42 and touchscreen controller 44 operate with a video controller 46. A player can make decisions and input signals into gaming device 10 by touching touchscreen 42 at appropriate places.

Gaming device 10 in an embodiment includes a plurality of communication ports for enabling communication between processor 12 and external peripherals, such as a server or central determination computer, external video sources, expansion buses, game or other displays, an SCSI port or key pad.

In one embodiment processor 12 communicates with one or more sounds cards 48. Sound card 48 operates with at least one speaker 50 and/or other sound generating hardware and software to generate sounds, such as voice or music for the primary and/or secondary game or for other modes of gaming device 10, such as an attract mode. Gaming device 10 is configured to provide dynamic sounds that couple with attractive multimedia images displayed on display devices 16 and/or 18 for base or bonus play. During idle periods, gaming device 10 may display a sequence of audio and/or visual attraction messages to attract potential players to gaming device 10. The audio/video outputs also provide any desired customized information, such as game play and pay table information. To that end, processor 12 may operate multiple imbedded screens, such as a game play or pay table screen that the player can recall selectively, e.g., by touching indicia on touchscreen 42 corresponding to the game play or pay table screen.

In one embodiment, gaming device 10 includes a camera (not illustrated) that communicates with processor 12. The camera is positioned to acquire an image of a player playing gaming device 10 and/or the surrounding area of gaming device 10. The camera can selectively acquire still or moving (e.g., video) images in an analog, digital or other suitable format. Gaming device 10 is further configured to display the camera images and the game in split-screen or picture-in-picture fashion on display device 16 and/or 18. For example, the camera may acquire an image of the player, after which that image is incorporated into the primary and/or secondary game as, e.g., a background image, game symbol or indicia.

Processor 12 enables the player to change the player's wager, add money to gaming device 10 and cash out from gaming device 10. Processor 12 responds to inquiries from the player, e.g., for pay table or game operation information. Processor 12 commands display devices 16 and 18 and speakers 50 to communicate the results of game play (e.g., actual outcome, rank of outcome, missed award opportunities and awards actually provided), bonus play, bonus pay and progressive pay.

Processor 12 also calculates any award that the player receives. The award may be in the form of a multiplier that multiplies the number of coins wagered, for example, the number of coins wagered on the payline. Many slot machines enable one to five coins to be wagered on any payline. If the award is a 50× multiplier, the player's ultimate award may range from fifty coins to two-hundred fifty coins depending on the wager made for the winning payline. Processor 12 performs this calculation and updates credit display 20 accordingly.

Base and Bonus Game Outcomes Determined Locally

In one embodiment, processor 12 of each individual gaming device 10 generates the base and bonus game outcomes randomly. In addition to winning credits in the base or primary game, such as slot, gaming device 10 also gives players the opportunity to win credits in a bonus or secondary game or bonus or secondary round. The bonus or secondary game enables the player to obtain a bonus prize or payout in addition to the prize or payout, if any, obtained from the base or primary game. A bonus or secondary game can produce a higher level of player excitement than the base or primary game because it can provide a greater expectation of winning than the base or primary game, can be accompanied by attractive and little seen or heard visual and audio outputs, and generally does not require a separate wager to play. The bonus game is implemented as a program code stored in a memory device, which processor 12 causes to being automatically.

With individual determination of outcomes, the level of success one machine experiences does not affect another machine's level of success. Memory device 14 stores one or more random number generators executed by the processor 12 to generate the outcomes randomly at the gaming device 10. In one embodiment, any outcome has the same probability of being generated upon each play. In another embodiment, outcomes are selected from a pool, wherein each outcome is removed from the pool after it is selected, increasing the probability for non-selected outcomes and potentially decreasing the probability for selected outcomes (if multiples of the same outcome reside in the pool).

Linked Gaming Devices and Central Processor

Figure 3:
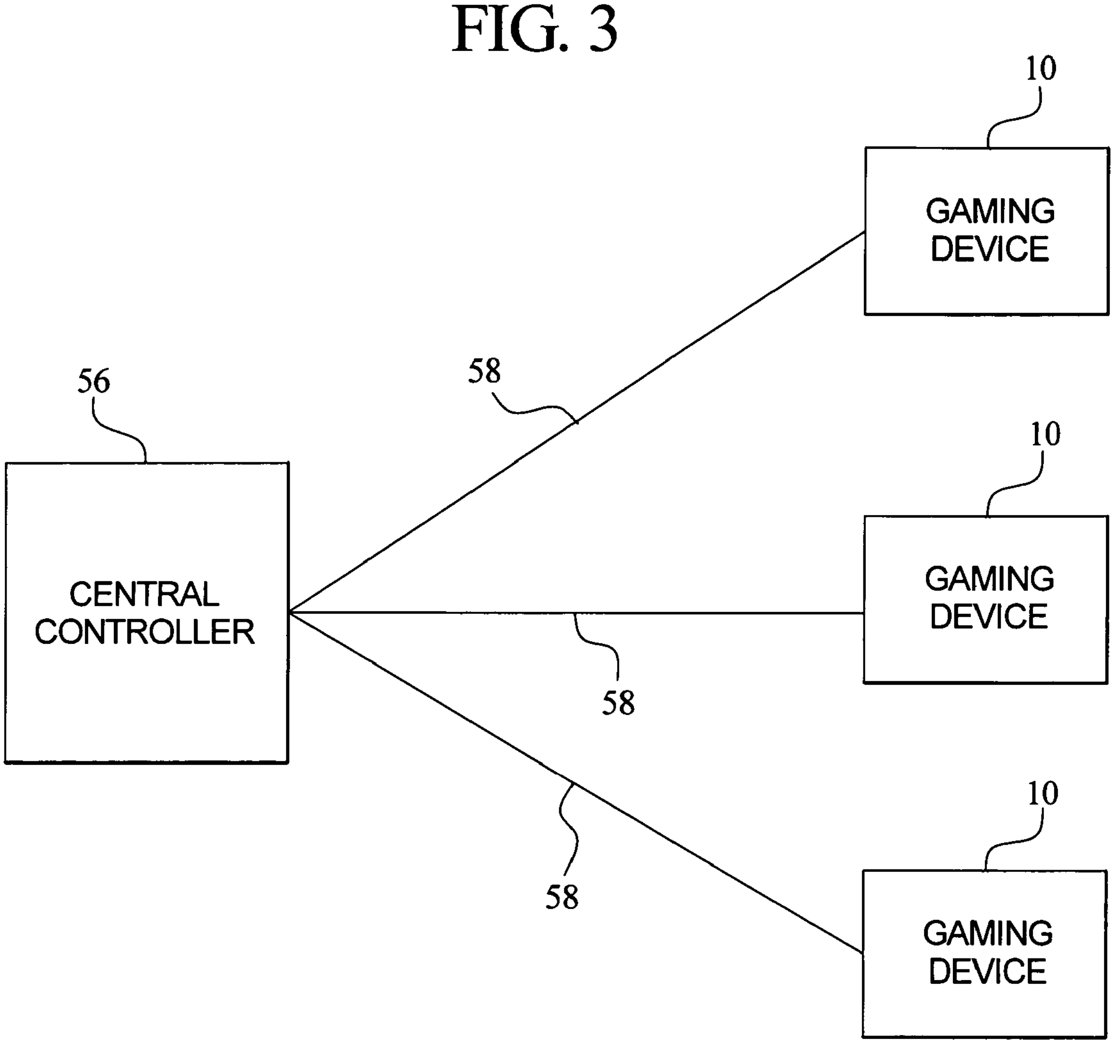
FIG. 3 is a schematic block diagram of one embodiment of a network configuration for a plurality of gaming devices disclosed herein.

As illustrated in FIG. 3, the present disclosure provide a plurality of the above described gaming devices 10, which can be linked to a data network via a remote communication link 58. Gaming devices 10 in the illustrated embodiment are connected via link 58 in a spoke-and-hub type fashion with a central server 56. More specifically, processor 12 of each gaming device facilitates transmission of signals between individual gaming devices 10 and central server 56. Central server 56 can operate a single cluster of machines 10 or multiple ones of such clusters.

Central server 56 in one embodiment is located physically separately from each of gaming devices 10. Central server 56 can be located out on the casino floor with gaming devices 10 of system 100 or elsewhere in the casino. In a further alternative embodiment, central server 56 is located remotely from gaming devices 10. Indeed, when implemented via an internet, gaming devices 10 can be personal computers, link 58 can be the internet and central server 56 can be located in a different state or country.

The data network of link 58 is in one embodiment a local area network ("LAN"), in which gaming devices 10 of system 100 are in communication with an on-site central server 56. Gaming devices 10 may be located in one part of a casino or in clusters in different parts of the casino. The LAN may be implemented via conventional phone or other data transmission line, digital signal line ("DSL"), T-1 line, coaxial cable, fiber optic cable, wireless ("e.g., radio frequency") gateway or other suitable connection.

In another embodiment, the data network of link 58 is a wide area network ("WAN"), in which gaming devices 10 are in communication with at least one off-site central server 56. In this embodiment, the gaming devices may be located in a different part of the gaming establishment or within a different gaming establishment than the off-site central server. The WAN may be implemented via conventional phone or other data transmission line, digital signal line DSL, T-1 line, coaxial cable, fiber optic cable, wireless ("e.g., radio frequency") gateway or other suitable connection.

In a further embodiment, the data network of link 58 is an internet or intranet. Here, the operation of gaming device 10 is viewed via at least one internet browser. Operation of gaming device 10 and accumulation of credits may be accomplished via a connection to the central server 56 (the internet/intranet server or webserver), such as a conventional phone or other data transmission line, digital signal line DSL, T-1 line, coaxial cable, fiber optic cable, wireless ("e.g., radio frequency") gateway or other suitable connection. Here, players may access system 100 via an internet game page and from any location in which an internet connection or other internet facilitator is available. The expansion in the number of computers and number and speed of internet connections in recent years increases opportunities for players to play from an ever-increasing number of remote sites. It should be appreciated that enhanced bandwidth of digital wireless communications may render such technology suitable for some or all communications according to the present disclosure, particularly if such communications are encrypted. Higher data transmission speeds may be useful for enhancing the sophistication and response of the display and interaction with the player.

Central server 56, via the LAN, WAN or internet network, is operable to build and distribute one or more progressive pool of funds. It is known in the art to apply a portion of each wager placed to initiate a base or primary game to such progressive pool. The pool builds until a triggering event causes the pool of funds to be distributed. The pool of funds can be distributed to a single machine or player or to multiple machines or players as desired by the game implementors.

For larger, multi-site linked progressive pools, central server 56 can (i) communicate with or (ii) operate as a host site server, which is coupled to a plurality of local servers at a variety of mutually remote gaming sites. The host site server collects funds from and services gaming devices distributed throughout a number of properties at different geographical locations including, for example, different locations within a city or different cities within a state. In an embodiment, the host site server oversees the entire progressive gaming system and is the master processor for computing progressive jackpots. All participating gaming sites report to, and receive information from, the host site server. The host cite server can be different than central server 56. Here, central server computer 56 is responsible for communicating data between gaming devices 10 of system 100 and the host site server.

Central Determination of Outcomes

In one embodiment, central server 56 generates the base game outcomes (e.g., slot, poker, keno or roulette outcomes) for the constituent gaming devices 10. Here, processors 12 do not operate directly with an on-board random number generator to produce random outcomes at the individual gaming devices. Instead, central server 56 employs one or more random number generator to determine random outcomes for each of the gaming devices 10. Processor 12 receives the outcome generated randomly at central server 56 and displays the outcome to the player on display device 16, 18. For example, if gaming device 10 is a slot machine, processor 12 receives a reel stop position outcome generated randomly at central server 56 and causes reels 54 to spin and stop at that reel stop position. Likewise, if gaming device 10 is a poker machine, processor 12 receives a poker hand outcome generated randomly at central server 56 and causes display device 16 or 18 to generate that poker hand.

In one embodiment, each gaming device 10 linked to server 56 sends an outcome request over link 58 to central server 56. Central server 56 receives the game outcome requests, for example at the end of a countdown, and generates game outcomes for each of the requesting machines. Central server 56 also determines if a bonus award is generated for one or more of the gaming devices 10. When central server 56 determines that a gaming device 10 is eligible for a bonus payout and sends a message to processor 12 of that gaming device 10. The gaming device 10 can display a suitable bonus payout message to the player on display device 16 or 18 and/or provide a suitable audio message via speakers 50.

For base game outcome generation, central server 56 in one embodiment generates base game outcomes using probabilities and at least one random number generator. According to the probability data, it is more likely that central server will generate, for example, two cherries versus three cherries in slot or one pair versus two pairs of cards in poker. There is no limitation however on the amount of times that any particular outcome can be generated randomly. Over time, the outcomes should be generated in a frequency based on their associated weighted probabilities.

For base game outcome generation, central server 56 in another embodiment maintains one or more predetermined pools or sets of predetermined game outcomes. Here, central server 56 receives the outcome requests from the gaming devices 10 and randomly selects predetermined game outcomes from the set or pool of game outcomes. Central server 56 then flags or marks the selected game outcomes as used. Once flagged as used, central server 56 cannot thereafter select the flagged outcomes after subsequent countdowns. Eventually, when all outcomes of the set or pool are selected and flagged, the sequence is reset and all outcomes become eligible.

How the generated or selected game outcomes are presented or displayed on the display devices 16 or 18 and/or speakers 50 can be determined by central server 56 or the individual game processors 12. Centralized production or control of base game outputs can assist a gaming establishment or other entity in maintaining appropriate records, controlling gaming, reducing and/or preventing cheating or electronic or other errors, reducing or eliminating win-loss volatility and the like.

Other Gaming Functions Determined Locally or Centrally

As discussed herein, many gaming functions can be performed locally or centrally as desired by the system implementers. For example, player tracking and profiling can be maintained locally or centrally. If a ticketing system is employed it may operate with processors 12 or central server 56. Processor 12 and central server 56 may cooperate to provide audio and video displays in accordance with a theme of the gaming devices.

The Gaming System Implemented with a Slot Game

In one embodiment, the present disclosure is implemented with slot machines or internet slot play. As seen in FIGS. 1A and 1B, each slot machine 10 (and the internet version of slot) includes one or more paylines 52. Paylines 52 may be horizontal, vertical, circular, diagonal, angled or any combination thereof. Slot machine gaming device 10 displays at least one reel 54, such as three to five reels in either electromechanical form with mechanical rotating reels or in video form with simulated reels and movement. In electromechanical form, stepper motors in an embodiment rotate and stop the reels at the randomly determined positions. In video form, reels 54 are simulated and made to look like they spin and stop through a video and/or animation display on display devices 16 and/or 18.

Referring now to FIG. 4, bet displays 22*a* to 22*c* display the number of paylines 52 played (e.g., nine), the bet made per payline 52 (e.g., five coins per payline) and the total bet (e.g., forty-five coins), respectively. Increase paylines button 36*a* and a bet one button 36*b* enable the player to change the number of paylines 52 wagered and bet per payline 52, respectively. In one embodiment, increase paylines button 36*a* is operable to enable the player to wager consecutive paylines 52, e.g., paylines one, two and three out of nine total paylines or wager non-consecutive paylines 52, e.g., paylines one and nine out of nine total paylines. In one embodiment, bet one button 36*b* is operable to enable the player to: (i) wager a same amount on each payline, for example, three credits out of five possible credits on paylines one, two and three out of nine total paylines; or (ii) wager different amounts on different paylines, for example, five credits, two credits and one credit, respectively, on paylines one, two and three (or paylines two, seven and eight) out of nine total paylines.

In the illustrated example, the player has one hundred total credits remaining after the current wager is set as seen via credit display 20. In this example, the player sets the wager by pressing enter button 60. The wager entry may be configured such that the player presses select lines input 36*a* to select the desired number of paylines, then presses the enter input 60 to enter the selected number of paylines and/or presses the wager per payline input 36*b* to select the desired number of paylines and then presses the enter input 60 to enter the selected wager per payline. Alternatively, the player presses enter input 60 once to enter or set any changes made to the number of paylines wagered or wager per payline (or to use the previous wager without changes).

In one embodiment, selection of maximum paylines via input 30*a*, maximum wager per payline via input 30*b* and/or maximum bet via input 30*c* sets the particular wager parameter without selection of enter input 60. In another embodiment, selection of maximum paylines via input 30*a*, maximum wager per payline via input 30*b* and/or maximum bet via input 30*c* in combination with a selection of the enter input 60 sets the particular wager parameter.

It should be appreciated that enter input 60 is not required. For example, the wager may become set after a certain amount of time after changing the number of paylines or wager per payline. Alternatively, the wager may become set after the player presses spin input 34. Here, the player may be prompted to determine if the player wants to redo the wager before the reels actually spin or the player is enabled to redo (undo or add to) the wager while the reels are spinning.

A redo's remaining display 62 shows that the player has accumulated three redo features or options. Thus, in the illustrated embodiment, the player is able to accumulate redo options which are each selectively individually activatable by the player (prior to expiration or termination, if any). As illustrated below, redo features are alternatively automatically executed or provided as one time opportunities.

In FIG. 4, an audio, visual or audiovisual message 64 informs the player the wager is currently set and that the player may press spin input 34 at any time to play the game. Message 64 reminds the player that at least one redo option remains (seen in redo's remaining display 62).

Inputs 66, 68 and 70 are illustrated for convenience on the single screen of display device 16 and 18 of gaming device 10. Gaming device 10 is operable to display and employ any one, a combination of or all of inputs 66, 68 and 70. In the illustrated embodiment, inputs 66, 68 and 70 are provided in combination with message 64. Message 64 in combination with input 66 informs the player that the player has the option to undo or nullify the bet before pressing spin input 34. Message 64 in combination with input 68 informs the player that the player has the option to undo or nullify the bet and resulting game play after pressing spin input 34 and generating a result. Message 64 in combination with input 70 informs the player that the player has the option to redo or increase the bet to enhance the resulting game play after pressing spin input 34 and generating a result.

Undo bet input 66 may be used when the player changes his/her mind about a wager or wishes to correct an improperly placed bet. Depending upon what result game play would have had, the choice to undo the bet may or may not be beneficial to the player. To that end, gaming device 10 in one embodiment, spin the reels and present the resulting outcome even after the wager has been removed. Gaming device 10 is configured alternatively to not reveal what the player would have received had the player not nullified the bet. In such case, upon the next wager and game play, gaming device 10 can be operable to use the same randomly generated outcome or generate a new outcome randomly. In one embodiment, this may not be possible because the outcome is only generated upon activation of the play button.

Undo play input 68 may be used when the player has an unsuccessful or non-successful enough play of gaming device 10. With undo play input 68 the player presses spin input 34 and the gaming machine generates an outcome. If the outcome is unsuccessful and the player wishes to undo the outcome, the player presses undo play input 68. The credits wagered on the previous play are credited back to the player and displayed in credit display 100. If the undo play feature is presented as an option, the player may wait for a particularly unsuccessful play to exercise the option. For example, if the player wagers all nine illustrated paylines, max wager per payline or maximum bet and does not generate a winning combination on any of the paylines, the player may decide that it is wise to then use the undo play feature of undo play input 68. In one embodiment, the gaming machine requires the player to be locked into or make the same bet or bet format in the subsequent play of the game. The undo play feature can thus result in a bonus event or play for the player because the player presumably does not use the undo play feature unless the play is unsuccessful, i.e., unless the undo play feature will or has a chance to benefit the player.

Redo bet input 70 may also be used when the player has a successful play of gaming device 10. With redo bet input 70 the player presses spin input 34 and the gaming machine generates an outcome. If the outcome is successful and the player wishes to upgrade the outcome (because the same or better symbol combination will be generated), the player presses redo bet input 70. The credits wagered on the previous play are increased so that the resulting outcome is increased. This assumes the same or better symbol combination which resulted in the first outcome will be generated. In many gaming machine, payouts are wager dependent or based on the level of wager. If the payout is five coins, it is often implicit that the payout is five coins per wagered coin. The bet may be increased to a fixed amount each time via the redo bet feature (e.g., maximum bet each time) or to a varying amount (e.g., randomly between three to five coins per payline wagered if player wagers two coins per payline).

If the redo bet feature is presented as an option, the player may wait for a particularly successful play to exercise the option. This assumes that the same or better symbol combination is generated with the higher wager amounts. For example, if the player wagers all nine illustrated paylines, max wager per payline or maximum bet and generates a winning symbol combination on all of the paylines, the player may decide that it is wise to then use the redo bet feature of redo bet input 70. The redo bet feature can result in a bonus for the player because the player presumably does not use the redo bet feature in this manner unless game play is successful, i.e., unless the redo bet feature will benefit the player.

The redo bet feature in one embodiment applies only to active (i.e., wagered upon) paylines that generate a winning symbol or combination. The redo feature in another embodiment applies to any paylines (active or non-active) that generate a winning symbol or symbol combination.

Figure 5:
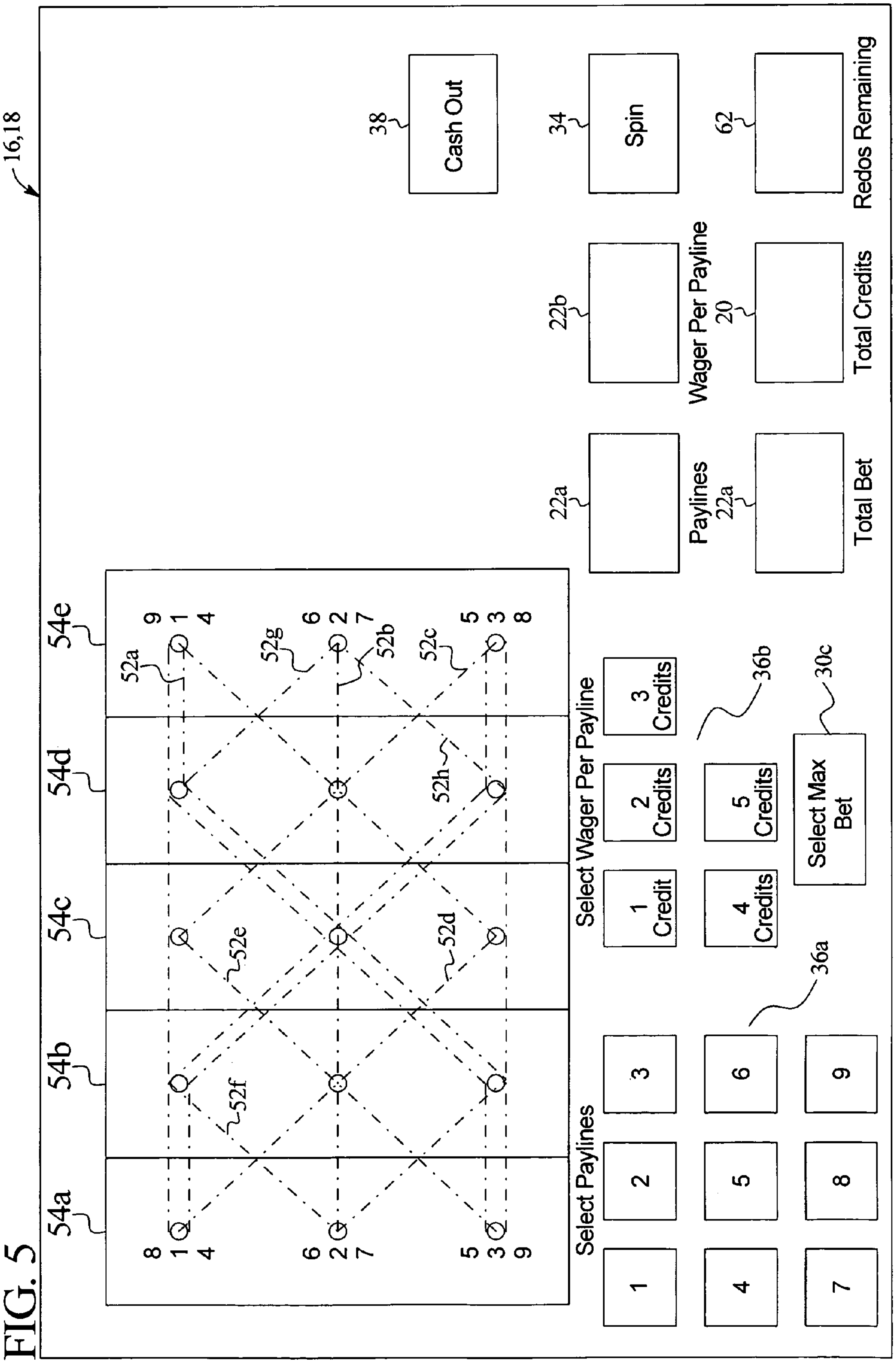
FIG. 5 is an elevation view of a display device of a slot machine showing an absolute entry aspect of the redo feature disclosed herein.

Referring now to FIG. 5, an alternative apparatus and method for setting or entering the player's wager is illustrated. Many of the same input devices from FIG. 4 are used, such as bet displays 22*a* to 22*c*, credit display 20, max bet button 30*c*, spin button 34, cash out button 38 and redo's remaining display 62. Here, nine absolute paylines wagered buttons 36*a* are provided, one for each selection. Five absolute wager per payline buttons 36*b* are provided, one for each selection. The player presses the absolute button corresponding to the number of paylines the player wishes to wager and a second absolute button corresponding the wager per payline the player wishes to make. The player does not need to scroll through the paylines and wagers until finding the desired number of paylines and wager per payline.

Accordingly, enter input 60 can be eliminated, while enabling the player to change the wager before pressing spin input 34 and without employing an elapsed time before setting the wager.

In an alternative embodiment enter input 60 is provided with the multiple paylines wagered buttons 36*a* and wager per payline buttons 36*b*. Message 64, undo bet input 66, undo play input 68 and redo play input 70 of FIG. 4 (collectively providing a redo feature) may be provided as described above with the apparatus of FIG. 5.

Figure 6:
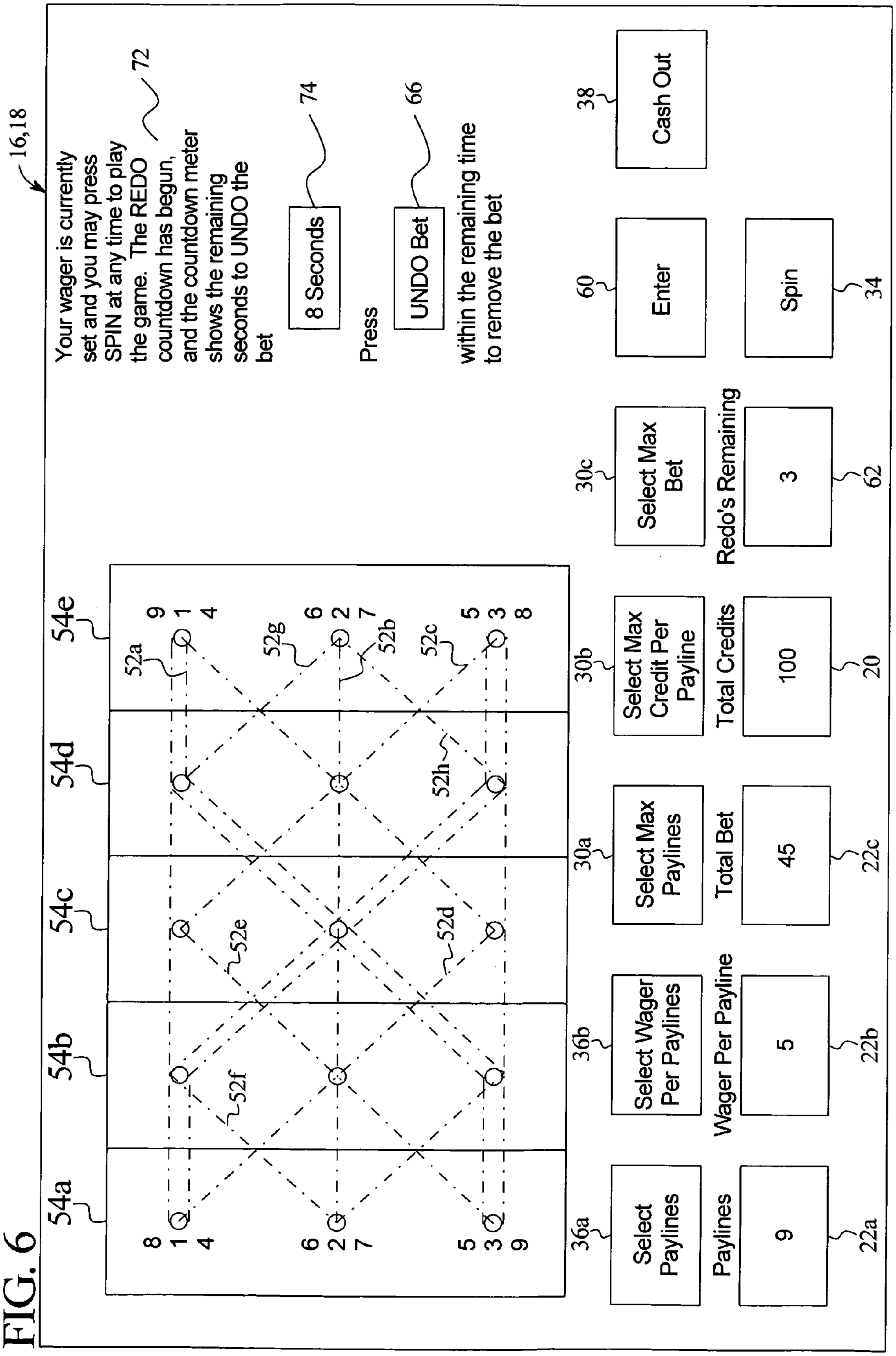
FIG. 6 is an elevation view of a display device of a slot machine showing a first countdown aspect of the redo feature disclosed herein

FIG. 6 illustrates an alternative embodiment for executing the redo feature. Here, an audio, visual or audiovisual message 72 is provided, which informs the player that the wager is currently set and that spin input 34 may be pressed at any time to play the game. A redo countdown is provided and is started automatically when the wager becomes set. Countdown meter 74 shows the seconds remaining within which the player may elect to press undo bet input 66.

The countdown illustrated in meter 74 may be implemented for the case in which the player either uses the redo feature or loses it. Alternatively, the countdown is implemented in an embodiment in which the player can accumulate and save redo features to use as desired. In this case, the countdown acts as a time limit in which the player must decide to use a redo feature for the current wager or save the feature for another wager.

The countdown illustrated in meter 74 may be implemented with any of the button arrangements and associated alternative embodiments discussed in connection with FIGS. 4 and 5. The amount of time for the countdown may be any suitable amount of time, such as two to fifteen seconds.

Figure 7:
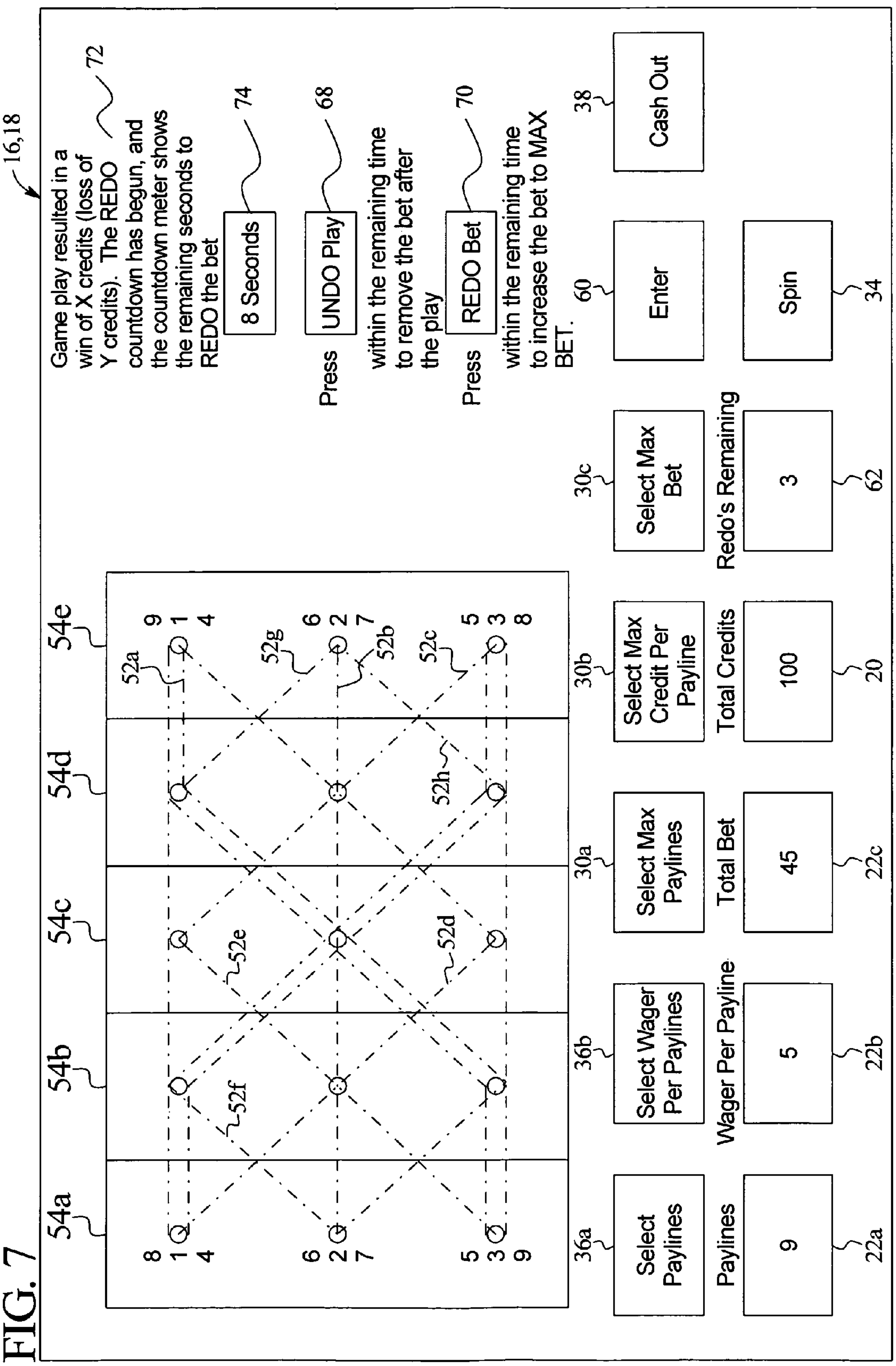
FIG. 7 is an elevation view of a display device of a slot machine showing a second countdown aspect of the redo feature disclosed herein.

FIG. 7 illustrates another alternative embodiment for executing the redo feature. Here, an audio, visual or audiovisual message 76 is provided, which informs the player that the previous game play resulted in a win of X credits (loss of Y credits). A redo countdown is provided and is started automatically after the game play result. Countdown meter 74 shows the seconds remaining within which the player may elect to press undo play input 68 (to nullify an unsuccessful play) or redo bet input 70 (to enhance a successful play). Either one or both the undo play 68 and redo bet 70 inputs may be provided.

The countdown illustrated in meter 74 may be implemented for the case in which the player either uses the undo play or redo bet feature or loses it. If the offer, in essence, is a one time offer then little incentive exists for the player not to nullify a bad play or enhance a good play. If the player can selectively use the redo features, then the player may wish to use the feature at a different time. In this case, the countdown acts as a time limit in which the player must decide to use a redo feature for the previous game play or save the feature for another game play. It should be appreciated that the time period may be extended in situations where certain events beyond the players control have occurred such as the occurrence of a credit roll up.

It is also possible for any of the embodiments described herein in which the redo feature may be conserved that the feature is only useable at certain times or in certain instances. If so, it may be advantageous to use a redo feature when possible even though it can be saved for later, e.g., if eligibility for the feature is relatively difficult to obtain.

The countdown illustrated in meter 74 of FIG. 7 may be implemented with any of the button arrangements and associated alternative embodiments discussed in connection with FIGS. 4 and 5. The amount of time for the countdown may be any suitable amount of time, such as two to fifteen seconds.

Figure 8:
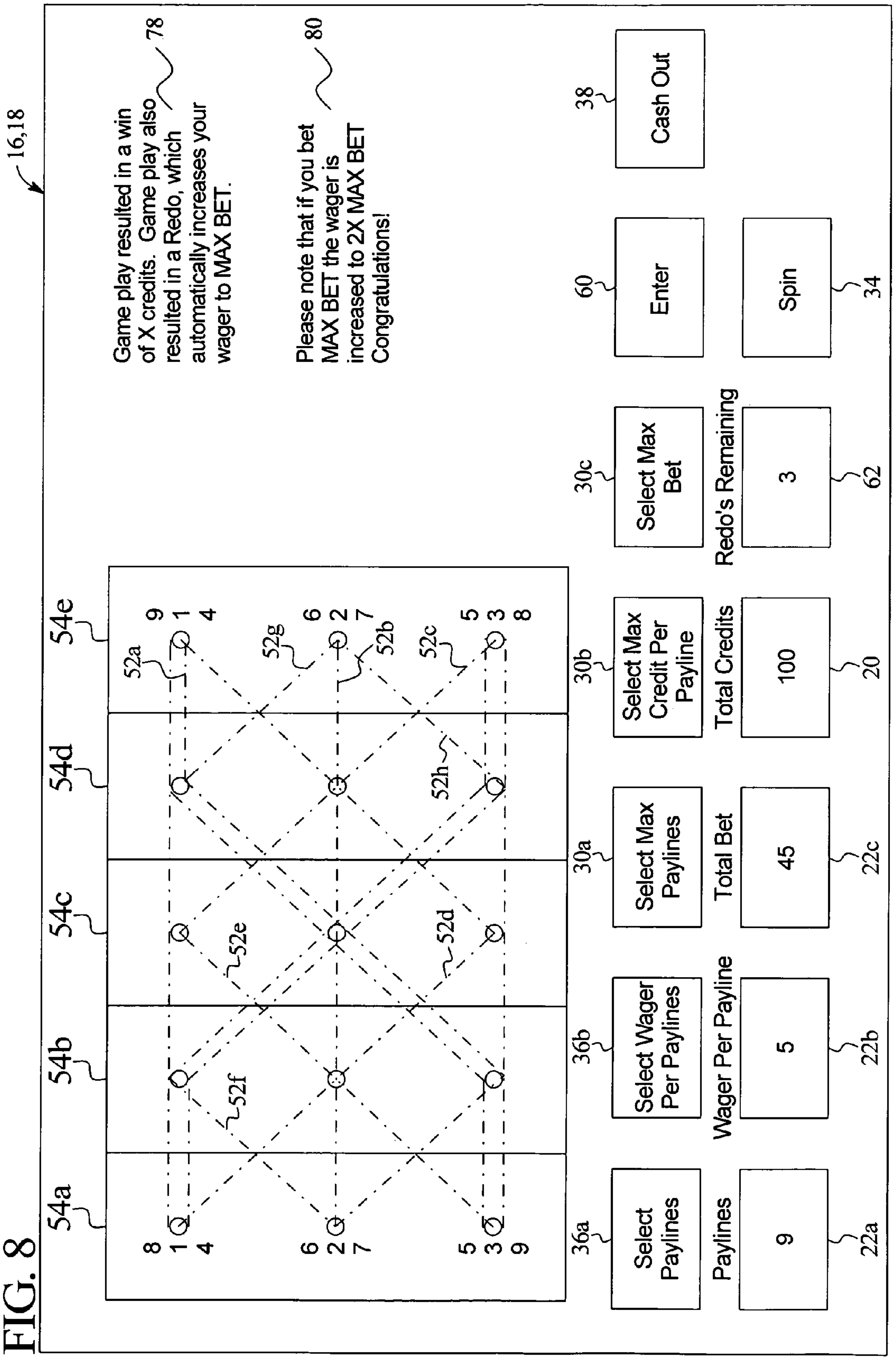
FIG. 8 is an elevation view of a display device of a slot machine showing an first automatically executed aspect of the redo feature disclosed herein.

Referring now to FIG. 8, another alternative embodiment for executing the redo feature is illustrated. Here, an audio, visual or audiovisual message 78 informs the player that the previous game play resulted in (i) a win of X credits and (ii) a redo feature, which automatically increases the player's wager to a max bet (e.g., from one coin on one payline to five coins on nine paylines). In one embodiment, the player's wager is increased for winning paylines (or poker hands, keno cards, etc) on which the player has wagered. If the player does not wager payline nine and payline nine results in a win, the enhanced bet does not capture the win on the non-wagered payline. Alternatively, the enhanced bet (e.g., max bet) does capture wins on non-wagered paylines. If the wager per payline is increased, the enhanced wager per payline can be applied to the win on the non-wagered payline.

The embodiment of FIG. 8 plays like an instantaneous bonus, which can be triggered in any of a plurality of ways discussed below in connection with the pay table of FIG. 10. The result is unquestionably positive for the player so there is no issue with changing the player's wager automatically. The automatic execution of FIG. 8 may be implemented with any of the button arrangements and associated alternative embodiments discussed in connection with FIGS. 4 and 5. Here, the wager need not be entered or set at a point prior to game play and any suitable method for wagering a slot, poker, keno, blackjack or other game may be implemented.

As seen in FIG. 8, message 80 informs the player that if the player had wagered max bet, the bet would have been increased to a multiple of (e.g., two times) max bet. This feature encourages the player to wager the maximum amount.

Figure 9:
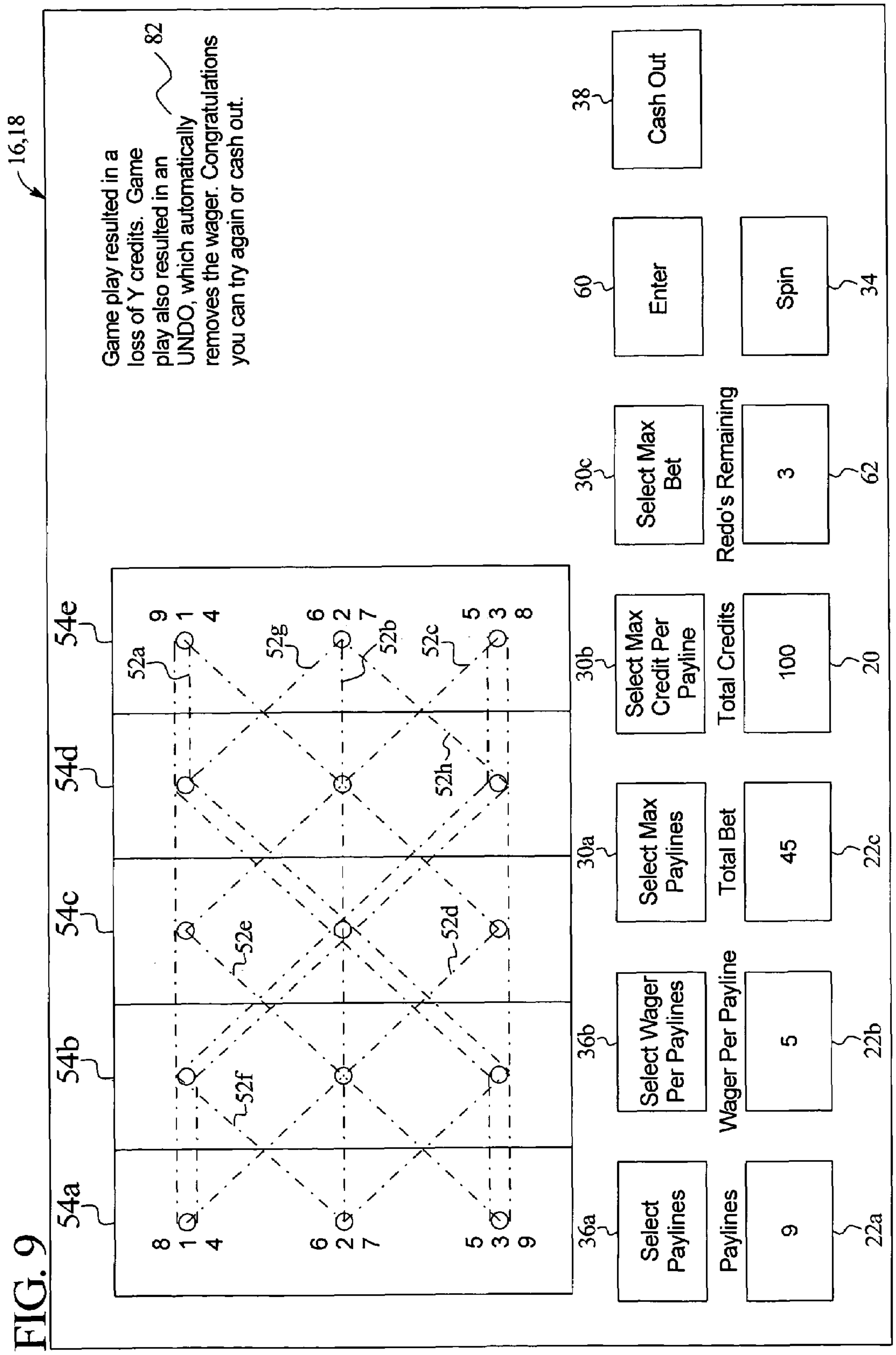
FIG. 9 is an elevation view of a display device of a slot machine showing a second automatically executed aspect of the redo feature disclosed herein.

Referring now to FIG. 9, a further alternative embodiment for executing the redo feature is illustrated. Here, an audio, visual or audiovisual message 82 informs the player that the previous game play resulted in (i) a loss of Y credits and (ii) an undo feature, which automatically removes or nullifies the player's wager and corresponding result. The credits wagered are credited back to credit meter 20. The player can then place another wager or cash out with an amount including the credited wager.

The embodiment of FIG. 9 also plays like an instantaneous bonus, which can be triggered in any of a plurality of ways discussed below in connection with the pay table of FIG. 10. The result is unquestionably positive for the player so there is no issue with changing the player's wager automatically. The automatic execution of FIG. 9 may be implemented with any of the button arrangements and associated alternative embodiments discussed in connection with FIGS. 4 and 5. Here again, the wager need not be entered or set at a point prior to game play and any suitable method for wagering a slot, poker, keno, blackjack or other game may be implemented.

Referring now to FIG. 10, a pay table of gaming device 10 is illustrated. The pay table may be recalled selectively on video monitor 16 and 18 or displayed permanently, such as on the upper glass of gaming device 10. The pay table lists the winning combinations and associated payouts (e.g., five cherries pays 1000× for slot, four-of-a-kind pays N coins for poker, etc.). The pay table also lists the ways in which redo features may be triggered or accumulated. The pay table shows both game play and wager requirements for triggering or acquiring the redo feature. It should be appreciated that gaming device 10 may have only: (i) one or more game play requirements, (ii) one or more wager requirements, or (iii) one or more of both types of requirements for triggering or acquiring the redo feature.

The pay table of FIG. 10 shows an example of a game play requirement, such as three of the same "R" symbol along the same payline. Other symbol combinations for triggering or acquiring one or more redo feature are within the level of skill in the art. The game play requirement may be accompanied by a wager requirement, such as: (i) that the symbols appear on an active payline, (ii) maximum paylines wagered, (iii) maximum wager per payline made, (iv) maximum bet wagered, etc. The pay table shown on display device 16, 18 illustrates other wager requirements for triggering or acquiring one or more redo features, such as: (i) after, e.g., fifty game plays, (ii) after, e.g., fifty credits wagered, (iii) after, e.g., fifty credits lost, (iv) after, e.g., fifty credits won, and/or (v) after, e.g., thirty minutes of continuous wagering without a cash out. Other wagering requirements for triggering or acquiring one or more redo feature are within the level of skill in the art.

The pay table also illustrates a different implementation for the redo feature, namely, as insurance. Here, the player may pay for a redo feature, which may be applied as insurance against an unsuccessful play of a particular wager. The pay table illustrates one example: for each, $1.00 wagered, the player may purchase an insurance undo feature for $0.25, which enables the player to undo or nullify the wager after game play. The player can keep a successful play (less $0.25) or limit the loss to $0.25 if the play is unsuccessful. In one embodiment, the insurance undo feature becomes available intermittently such as once every ten game plays. In another embodiment, the player can undo the wager at any time before game play but after the wager is set for, e.g., $0.05. Insurances undo features may have a one-time only lifespan or be collectable in alternative embodiments.

The pay table also illustrates that the redo feature may be implemented in a bonus game or bonus play. Bonus game play can award a range of redo features, such as two to ten redo features. In any of the above-described acquisition or bonus embodiments, the redo features can be accumulated and downloaded to a player tracking account or ticket if unused.

Referring now to FIG. 11, an operation screen of gaming device 10 is illustrated. The operation screen explains the operation of the redo feature to the player. The operation screen may be recalled selectively on video monitor 16, 18 or displayed permanently, e.g., on the glass of gaming device 10. The operation screen shows two main operational parameters: (i) how the redo feature is recalled, and (ii) how long the redo feature is available. The operation screen may not explain all of the parameters shown, which are shown on one screen for convenience.

According to the operation screen, redo featured may be recalled: (i) randomly without player input; (ii) selectively from or based on a player tracking account; (iii) selectively from a ticket, voucher, etc.; (iv) selectively from a promotion; e.g., casino or gaming device manufacturer promotion; or (v) purchased as insurance. Other recall methods are within the level of skill in the art.

According to the operation screen, the redo feature may remain available: (i) for the next play only; (ii) over a predetermined number of plays; (iii) over a randomly determined number of plays; (iv) until a redo feature termination is generated; (v) until the player cashes out; (vi) until the player exhausts all credits (before player puts more credits on the machine); (vii) over a set period of time; and (viii) indefinitely, unused or accumulated redo features may be saved to a player tracking card or printed onto a ticket. It should also be appreciated that the unused redo feature may be saved on a player account on a server in a casino.

Figure 12:
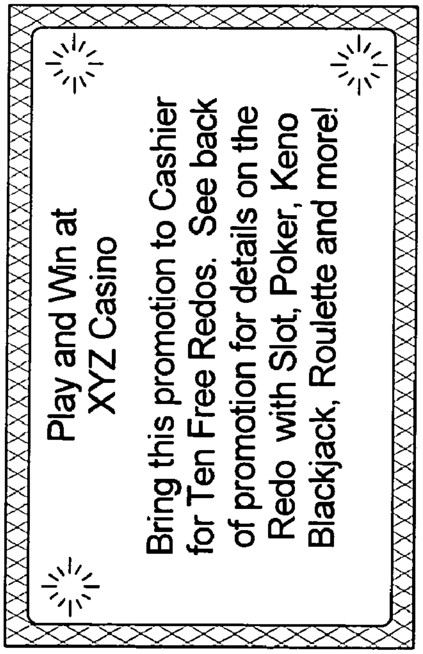
FIG. 12 is an elevation view of an example of a promotion disclosed herein.

Referring now to FIG. 12, a player promotion 84 is illustrated. Player promotion 84 in one embodiment includes a memory strip, barcode or other type of electronic recording and machine readable media (not illustrated), wherein promotion 84 is inserted directly in gaming device 10. In an alternative embodiment, the player takes the promotion to a cashier or other casino employee who credits the player with one or more redo features via the player's tracking card or ticket (shown below). In the illustrated example, promotion 84 informs the player to bring promotion 84 to the casino cashier for ten free redo features. Promotion 84 provides additional information, such as details on use of the redo feature with slot, poker, keno, blackjack, roulette, etc. Promotion 84 can provide additional details concerning where and when the promotion is redeemable, etc.

Figure 13:
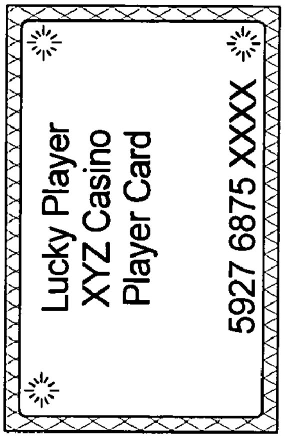
FIG. 13 is an elevation view of an example of a player tracking card operable with the redo feature disclosed herein.

Referring now to FIG. 13, a player tracking card 86 is illustrated. Player tracking card 86 includes a memory strip or other type of electronic recording and machine readable media (not illustrated). Player tracking cards are known in the art and operate with player tracking systems which track play and which are useful to the casino for promotional, marketing and other reasons. Here, the card and player tracking system is used additionally or alternatively to record and track one or more redo features that the player can recall or resave selectively. The redo features can be saved for later use upon a cash out. Upon a cash out, if gaming device 10 displays an accumulated number of redo features, gaming device 10 can present an audio, visual or audiovisual message informing the player to save the accumulated redo features to the player tracking card 86 (or automatically saves the accumulated redo features to the player tracking card 86). It should also be appreciated that an unused redo feature may be assigned a cash value such that when the player cashes out, he gets an increased payout due to unused redo features. This cash value may be the calculated cost of offering the redo feature.

Figure 14:
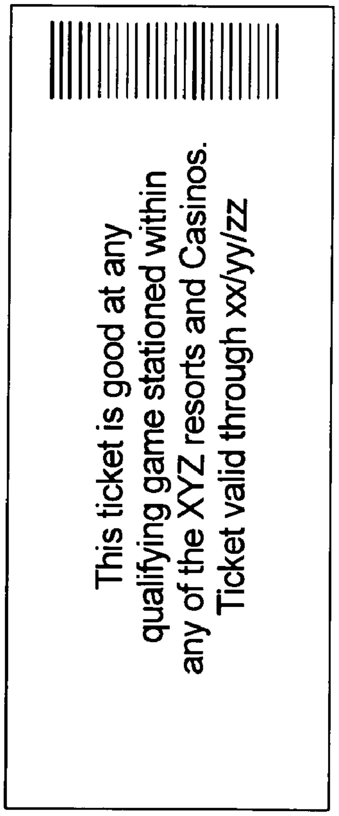
FIG. 14 is an elevation view of an example of a ticket or voucher card operable with the redo feature disclosed herein.

It should further be appreciated that redo features may be provided as part of the ticketing system instead of the player tracking system, such that a ticket indicates the number or value of the redo features cashed out. Referring now to FIG. 14, a ticket or voucher 88 is illustrated. Ticket or voucher 88 includes a barcode 90 or other type of electronic recording and machine readable media. Tickets or vouchers 88 are known in the art and operate with cashless ticket-in/ticket-out systems, which enable the player to insert funds and take funds out of the machine. Here, the barcode 90 of ticket 88 is used additionally or alternatively to record and track one or more redo features that the player can recall or resave selectively. The ticket 88 can also save for later use recall features generated for the first time during game play, e.g., upon a cash out. Upon a cash out, if gaming device 10 displays an accumulated number of redo features, gaming device 10 can present an audio, visual or audiovisual message informing the player to save the accumulated redo features to the ticket and voucher 88 (or automatically saves the accumulated redo features to the voucher 88).

Thus, it should be appreciated that the relevant redo feature information can be saved to a card, ticket or other suitable device and/or in a casino memory device accessible using a card, ticket or other suitable device.

The Gaming System Implemented with Poker

The redo feature may also be implemented with poker machines, table poker or with internet poker or other games. In one embodiment gaming device 10 plays a standard game of stud poker, which may or may not include a wild card. For example, gaming device 10 can deal five cards, all face up, from a virtual deck of fifty-two cards, from multiple decks of cards or from some other grouping of playing cards. Like multiple paylines of slot, the player may play multiple hands of poker simultaneously. Here, each hand may be dealt from a single deck or a same group of multiple decks. Or, each hand may be dealt from a different deck or different group of multiple decks. Game play results in a single hand of cards or multiple hands of cards.

All of the above-described alternative embodiments described in connection with slot for FIGS. 4 to 9 are applicable to poker. The poker game can provide wager options such as "select hands," "wager per hand," "max hands," "max wager per hand," and "max bet." The poker game can employ the enter button 60 of FIG. 4, the absolute entry buttons **36*a* and 36*b* of FIG. 5, the countdown displays 74 of FIGS. 6 and 7, the automatic executions 78 and 82**. It should also be appreciated that the redo feature may be employed in the middle of the hand such as before a designated draw or final draw.

The alternative embodiments described above in connection with slot for the game play and wager acquisition and triggering requirements in FIG. 10 are applicable to poker. The alternative embodiments described above in connection with slot for the operation of the redo feature in FIG. 11 are applicable to poker and other suitable card game. The promotion 84, player tracking card 86 and ticket 88 of FIGS. 12 to 14, and all disclosed alternative embodiments, are applicable to poker and other suitable card game.

In one embodiment, the redo feature is applied to poker by enabling the player to redo his dealt cards, but giving him different draw cards. For example the player may be dealt a King of Hearts, Queen of Hearts, Jack of Hearts, Jack of Spades and Three of Diamonds. The player chooses to hold the King of Hearts, Queen of Hearts and Jack of Hearts. The player draws a Four of Spades an a Seven of Clubs. The player is awarded nothing since his hand contains no poker win. The player chooses to implement the redo feature and is given the same five cards dealt. This time, he holds the Jack of Hearts and Jack of Spades. He draws a Three of Hearts, a Three of Clubs and an Ace of Diamonds and he is paid for a Two Pair win.

The Gaming System Implemented with Keno

In another embodiment, the redo feature is implemented with keno machines, table keno or with internet keno. In keno, the player selects a set of numbers from a larger pool of numbers. Numbers are then drawn randomly from the pool and compared with the player's set of numbers. Gaming device 10 displays the drawn numbers to determine an amount of matches, if any, between the player's selected numbers and the gaming device's drawn numbers. The player is provided an award, if any, based on the amount of matches between player and gaming device numbers according to a set pay table.

All of the above-described alternative embodiments described in connection with slot for FIGS. 4 to 9 are applicable to keno. The keno game can provide wager options such as "select keno games," "wager per keno game," "max games," "max wager per game," and "max bet." The keno game can employ the enter button 60 of FIG. 4, the absolute entry buttons 36*a* and 36*b* of FIG. 5, the countdown displays 74 of FIGS. 6 and 7, the automatic executions 78 and 82.

The alternative embodiments described above in connection with slot for the game play and wager acquisition and triggering requirements in FIG. 10 are applicable to keno. The alternative embodiments described above in connection with slot for the operation of the redo feature in FIG. 11 are applicable to keno. The promotion 84, player tracking card 86 and ticket 88 of FIGS. 12 to 14, and all disclosed alternative embodiments, are applicable to keno.

The Gaming System Implemented with Roulette

In a further embodiment, the redo feature is implemented with roulette machines, table roulette or internet roulette. The game of roulette can include a wheel with thirty-seven or thirty-eight 38 stops and a ball that can land with equal chance in any of those stops. Players wager by marking betting areas of a corresponding roulette table. After all bets are placed, a ball is spun and lands randomly on a number. Wagers placed on the winning number or on groups that include the winning number are paid a multiple of the bet. The house collects all other wagers. A sample pay scale for roulette is as follows: (i) even, odd, red, black pay 1:1; (ii) Groups of numbers 1 to 12, 12 to 24, 25 to 36 and columns of numbers on table pay 2:1; (iii) any single number pays 35:1; and (iv) any two number combination pays 17:1.

All of the above-described alternative embodiments described in connection with slot for FIGS. 4 to 9 are applicable to roulette. The roulette game can provide wager options such as "select roulette games," "wager per roulette game," "max games," "max wager per game," and "max bet." The roulette game can employ the enter button 60 of FIG. 4, the absolute entry buttons 36*a* and 36*b* of FIG. 5, the countdown displays 74 of FIGS. 6 and 7, the automatic executions 78 and 82.

The alternative embodiments described above in connection with slot for the game play and wager acquisition and triggering requirements in FIG. 10 are applicable to roulette. The alternative embodiments described above in connection with slot for the operation of the redo feature in FIG. 11 are applicable to roulette. The promotion 84, player tracking card 86 and ticket 88 of FIGS. 12 to 14, and all disclosed alternative embodiments, are applicable to roulette.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A gaming device operated under control of a processor, the gaming device comprising:

a wagering game controlled by the processor;

at least one display device; and at least one input device, wherein the processor is configured to operate with the at least one display device and the at least one input device for a play of the wagering game to:

(a) receive an input from a player to set a wager for the play of the wagering game, (b) display designated outcome of the play of the wagering games, wherein the designated outcome is associated with a designated award amount, and the designated award amount is based on the designated outcome of the play of the wagering game and the wager for the play of the wagering game, and (c) receive an input from the player to redo the setting of the wager for said play of the wagering game after displaying the designated outcome, wherein:

(i) if the processor receives the input of the redo, the processor does not provide the player with the designated award amount, enables the player to set a different wager for the play of the wagering game, and provides the player with a different award amount, the different award amount based on the designated outcome of the play of the wagering game and the different wager for the play of the wagering game, and (ii) if the processor does not receive the input of the redo, the processor provides the player with the designated award amount associated with the designated outcome of the play of the wagering game.

2. The gaming device of claim 1, wherein the wagering game is selected from the group consisting of: slot, poker, keno, blackjack, craps and roulette.

3. The gaming device of claim 1, wherein the at least one input device is selected from the group consisting of: a select payline button, a wager per payline button, a maximum payline button, a maximum wager per payline button, a maximum overall wager button, a select number of poker hands to play button, a select wager per poker hand button, a maximum number of poker hands button, a maximum wager per poker hand button, a wager per keno game played button, a wager per blackjack hand button, a craps wager button, a roulette wager button, and a confirm button.

4. The gaming device of claim 1, wherein the at least one display device is selected from the group consisting of: an electromechanical display device and a video display device.

5. The gaming device of claim 1, wherein the processor is configured to operate with the at least one display device and the at least one input device to selectively enable the player to input a redo of the setting of the wager for a plurality of plays of the wagering game.

6. The gaming device of claim 1, wherein the processor is configured to operate with the at least one display device and the at least one input device to: (a) display the designated award amount associated with the designated outcome after displaying the designated outcome, and (b) enable the player to input the redo of the setting of the wager for the play of the wagering game: (i) after displaying the designated outcome, and (ii) before displaying the designated award amount associated with the designated outcome.

7. The gaming device of claim 1, wherein the processor is configured to operate with the at least one display device and the at least one input device to: (a) display the designated award amount after displaying the designated outcome, and (b) enable the player to input the redo of the setting of the wager for the play of the wagering game after displaying the designated award amount associated with the designated outcome.

8. The gaming device of claim 1, wherein the different wager for the play of the wagering game is smaller than the wager set by the player for the play of the wagering game.

9. The gaming device of claim 1, wherein the different wager for the play of the wagering game is larger than the wager set by the player for the play of the wagering game.

10. The gaming device of claim 1, wherein the processor is configured to operate with the at least one display device and the at least one input device to, if the player does not input the redo of the setting of the wager for the play of the wagering game: (a) automatically redo the setting of the wager for the play of the wagering game, (b) automatically input a larger wager for said play of the wagering game, and (c) provide the player with an award amount, if any, associated with the designated outcome of the play of the wagering game based on the larger wager.

11. A gaming device operated under control of a processor, the gaming device comprising:

a wagering game controlled by the processor;

at least one display device; and at least one input device, the processor configured to operate with the at least one display device and the at least one input device for a play of the wagering game to:

(a) receive an input from a player to set a wager for the play of the wagering game, (b) randomly select a number, (c) determine a designated outcome of the play of the wagering game based, at least in part, on said randomly selected number, wherein the designated outcome is associated with a designated award amount, and the designated award amount is based on the designated outcome of the play of the wagering game and the wager for the play of the wagering game, (d) determine if a redo is available after the wager is set, the redo being available if at least one activatable trigger is activated, (e) if the redo is available, receive an input from the player to activate the redo after randomly selecting the number and before displaying any part of the designated outcome, wherein if the redo is activated, the processor does not provide the player with the designated award amount, enables the player to set a different wager for the play of the wagering game, and provides the player with a different award amount, wherein the different award amount is based on the designated outcome of the play of the wagering game and the different wager for the play of the wagering game, and (f) if the redo not available, provide the player with the designated award amount associated with the designated outcome for the play of the wagering game.

12. The gaming device of claim 11, wherein the wagering game is selected from the group consisting of: slot, poker, keno, blackjack, craps and roulette.

13. The gaming device of claim 11, wherein the at least one input device is selected from the group consisting of: a select payline button, a wager per payline button, a maximum payline button, a maximum wager per payline button, a maximum overall wager button, a select number of poker hands to play button, a select wager per poker hand button, a maximum number of poker hands button, a maximum wager per poker hand button, a wager per keno game played button, a wager per blackjack hand button, a craps wager button, a roulette wager button, and a confirm button.

14. The gaming device of claim 11, wherein the at least one display device is selected from the group consisting of: an electromechanical display device and a video display device.

15. The gaming device of claim 11, wherein the processor is configured to operate with the at least one display device and the at least one input device to selectively enable the player to input redo of the setting of the wager for a plurality of plays of the wagering game.

16. A method of operating a gaming device having a wagering game, the method comprising, for a play of the wagering game:

(a) receiving an input from a player to set a wager for the play of the wagering game;

(b) displaying designated outcome of the play of the wagering game, wherein the designated outcome is associated with a designated award amount, and the designated award amount is based on the designated outcome of the play of the wagering game and the wager for the play of the wagering game;

(c) if the player inputs a redo, receiving the input from the player to redo the setting of the wager for said play of the wagering game after displaying the designated outcome, wherein if the input from the player to redo the setting of the wager is received, the player is not provided with the designated award amount associated with the designated outcome of said play of the wagering game, the player is enabled to set a different wager for the play of the wagering game, and the player is provided with a different award amount, the different award amount based on the designated outcome of the play of the wagering game and the different wager for the play of the wagering game; and (d) if the player does not input the redo, providing the player with any award amount associated with the designated outcome of said play of the wagering game.

17. The method of claim 16, wherein the wagering game is selected from the group consisting of: slot, poker, keno, blackjack, craps and roulette.

18. The method of claim 16, which includes selectively enabling the player to input a redo of the setting of the wager for a plurality of plays of the wagering game.

19. The method of claim 16, which includes displaying the designated award amount associated with the designated outcome of the wagering game, and enabling the player to input the redo of the setting of the wager for the play of the wagering game after displaying the designated outcome and before displaying the designated award amount associated with the designated outcome of the play of the wagering game.

20. The method of claim 16, which includes: (a) displaying the designated award amount associated with the designated outcome of the play of the wagering game, and (b) enabling the player to input the redo of the setting of the wager for the play of the wagering game after displaying the designated award amount associated with the designated outcome of the play of the wagering game.

21. The method of claim 16, wherein the different wager for the play of the wagering game is smaller than the wager set by the player for the play of the wagering game.

22. The method of claim 16, wherein the different wager for the play of the wagering game is larger than the wager set by the player for the play of the wagering game.

23. The method of claim 16, which includes, if the player does not input the redo of the setting of the wager for the play of the game: (a) automatically redoing the setting of the wager for the play of the wagering game, (b) automatically inputting a larger wager for said play of the wagering game, and (c) providing the player with an award amount, if any, associated with the designated outcome of the play of the wagering game based on the larger wager.

24. The method of claim 16, which is provided through a data network.

25. The method of claim 24, wherein the data network is the internet.

26. A method of operating a gaming device having a wagering game, said method comprising, for a play of the wagering game:

(a) receiving an input from a player to set a wager for the play of the wagering game;

(b) randomly selecting a number;

(c) determining a designated outcome of the play of the wagering game based, at least in part, on said randomly selected number, wherein the designated outcome is associated with a designated award amount, and the designated award amount is based on the designated outcome of the play of the wagering game and the wager for the play of the wagering game, (d) determining if redo is available to the player, the redo being available if at least one activatable trigger is activated;

(e) if the redo is available, receiving an input from the player to activate the redo after randomly selecting the number and before displaying any part of the designated outcome, wherein if the redo is activated, the player is not provided with the designated award amount associated with the designated outcome of the play of the wagering game, the player is enabled to set a different wager for the play of the wagering game, and the player is provided with a different award amount, wherein the different award amount is based on the designated outcome of the play of the wagering game and the different wager for the play of the wagering game; and (f) if said redo not available, providing the player with the designated award amount associated with the designated outcome of said play of the wagering game.

27. The method of claim 26, wherein the wagering game is selected from the group consisting of: slot, poker, keno, blackjack, craps and roulette.

28. The method of. claim 26, which includes selectively enabling the player to input redo of the setting of the wager for a plurality of plays of the wagering game.

29. The method of claim 26, which is provided through a data network.

30. The method of claim 29, wherein the data network is the internet.

31. A gaming device comprising:

at least one processor;

at least one display device; and at least one input device, wherein the at least one processor is configured to operate with the at least one display device and the at least one input device for a play of a wagering game to:

(a) receive an input from a player to set a wager for the play of the wagering game, (b) after receiving the input to set the wager, start the play of the wagering game, said start including the selection of at least one random number, (c) determine a designated outcome of the play of the wagering game based, at least in part, on the at least one random number, wherein the designated outcome is associated with a designated award amount, and the designated award amount is based on the designated outcome of the play of the wagering game and the wager for the play of the wagering game, (d) display the designated outcome, and (e) receive an input from the player to undo the setting of the wager for the play of the wagering game after selecting the at least one number and before displaying the designated outcome of the play of the wagering game, wherein:

(i) if the processor receives the input of the undo, the processor nullifies the setting of the wager for the play of the wagering game and does not provide the player with any award amount associated with the designated outcome of the play of the wagering game, and (ii) if the processor does not receive the input of the undo, the processor provides the player with the designated award amount associated with the designated outcome of the play of the wagering game.

32. The gaming device of claim 31, wherein the wagering game is selected from the group consisting of: slot, poker, keno, blackjack, craps and roulette.

33. The gaming device of claim 31, wherein the at least one input device is selected from the group consisting of: a select payline button, a wager per payline button, a maximum payline button, a maximum wager per payline button, a maximum overall wager button, a select number of poker hands to play button, a select wager per poker hand button, a maximum number of poker hands button, a maximum wager per poker hand button, a wager per keno game played button, a wager per blackjack hand button, a craps wager button, a roulette wager button, and a confirm button.

34. The gaming device of claim 31, wherein the at least one display device is selected from the group consisting of: an electromechanical display device and a video display device.

35. The gaming device of claim 31, wherein the at least one processor is configured to operate with the at least one display device and the at least one input device to selectively receive an input of an undo for a plurality of plays of the wagering game.

36. The gaming device of claim 31, wherein the at least one processor is configured to operate with the at least one display device and the at least one input device to: (a) display the designated award amount associated with the designated outcome of the play of the wagering game after displaying the designated outcome, and (b) receive the input of the undo: (i) after displaying the designated outcome, and (ii) before displaying the designated award amount associated with the designated outcome of the play of the wagering game.

37. The gaming device of claim 31, wherein the processor is configured to operate with the at least one display device and the at least one input device to: (a) display the designated award amount after displaying the designated outcome, and (b) receive the input of the undo after displaying the designated award amount associated with the designated outcome of the play of the wagering game.

38. The gaming device of claim 31, wherein the processor is configured to operate with the at least one display device and the at least one input device to receive the input of the undo: (a) after selecting the at least one random number, and (b) before displaying any portion of the designated outcome of the play of the wagering game.

39. The gaming device of claim 31, wherein the processor is configured to operate with the at least one display device and the at least one input device to automatically start the play of the wagering game after a predetermined period of time after the wager is set.

40. A method of operating a gaming device having a wagering game, the method comprising, for a play of the wagering game:

(a) receiving an input from a player to set a wager for the play of the wagering game;

(b) starting the play of the wagering game after receiving the input to set the wager, said starting the play of the wagering game including selecting a random number;

(c) determining an outcome of the play of the wagering game, the outcome being based, at least in part, on said random number, wherein the designated outcome is associated with a designated award amount, and the designated award amount is based on the designated outcome of the play of the wagering game and the wager for the play of the wagering game;

(d) displaying the designated outcome;

(d) if the player inputs an undo, receiving the input from the player to undo the setting of the wager after selecting the random number, wherein if the input from the player to undo the setting of the wager is received, the setting of the wager for the play of the wagering game is nullified and the player is not provided with any award amount associated with the designated outcome of said play of the wagering game; and (e) if the player does not input an undo, providing the player with the designated award amount associated with the designated outcome of the play of the wagering game.

41. The method of claim 40, wherein the wagering game is selected from the group consisting of: slot, poker, keno, blackjack, craps and roulette.

42. The method of claim 40, which includes selectively receiving the input of the undo for a plurality of plays of the wagering game.

43. The method of claim 40, which includes displaying the designated award amount associated with the designated outcome of the play of the wagering game, and receiving the input of the undo after displaying the designated outcome of the play of the wagering game and before displaying the designated award amount associated with the designated outcome of the play of the wagering game.

44. The method of claim 40, which includes: (a) displaying the designated award amount associated with the designated outcome of the play of the wagering game, and (b) receiving the input of the undo after displaying the designated award amount associated with the designated outcome of the wagering game.

45. The method of claim 40, which includes receiving the input of the undo: (a) after selecting the random number, and (b) before displaying the designated outcome of the play of the wagering game.

46. The method of claim 40, which is provided through a data network.

47. The method of claim 40, wherein the data network is the internet.

48. The gaming device of claim 11, wherein at least one of the plurality of activatable triggers is selected from the group consisting of: a randomly occurring trigger, a wager requirement, a game plays requirement, a credits wagered requirement, a credits lost or won requirement, a time requirement, an additional wager requirement, and an undo credit.

49. The method of claim 26, wherein at least one of the plurality of activatable triggers is selected from the group consisting of: a randomly occurring trigger, a wager requirement, a game plays requirement, a credits wagered requirement, a credits lost or won requirement, a time requirement, an additional wager requirement, and an undo credit.

* * * * *

UNITED STATES PATENT AND TRADEMARK OFFICE

CERTIFICATE OF CORRECTION

PATENT NO. : 7,572,183 B2
APPLICATION NO. : 11/215790
DATED : August 11, 2009
INVENTOR(S) : Consuelo Olivas et al.

It is certified that error appears in the above-identified patent and that said Letters Patent is hereby corrected as shown below:

In Claim 40, Column 25, Line 25, change "(d)" to --(e)--.

In Claim 40, Column 25, Line 33, change "(e)" to --(f)--.

Signed and Sealed this

Sixth Day of October, 2009

David J. Kappos
*Director of the United States Patent and Trademark Office*

UNITED STATES PATENT AND TRADEMARK OFFICE

CERTIFICATE OF CORRECTION

PATENT NO. : 7,572,183 B2
APPLICATION NO. : 11/215790
DATED : August 11, 2009
INVENTOR(S) : Olivas et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 620 days.

Signed and Sealed this

Fourteenth Day of December, 2010

David J. Kappos
*Director of the United States Patent and Trademark Office*